(12) United States Patent
Ou et al.

(10) Patent No.: US 12,199,609 B2
(45) Date of Patent: Jan. 14, 2025

(54) MULTIPLE SUPPLY VOLTAGE TRACKS AND STANDARD CELLS

(71) Applicant: Taiwan Semiconductor Manufacturing Company, Ltd., Hsinchu (TW)

(72) Inventors: Hung-Chih Ou, Kaohsiung (TW); Wen-Hao Chen, Hsin-Chu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

(21) Appl. No.: 18/442,655

(22) Filed: Feb. 15, 2024

(65) Prior Publication Data
US 2024/0223163 A1 Jul. 4, 2024

Related U.S. Application Data

(63) Continuation of application No. 17/873,952, filed on Jul. 26, 2022, now Pat. No. 11,942,941.

(51) Int. Cl.
*H03K 3/012* (2006.01)
*H03K 17/56* (2006.01)

(52) U.S. Cl.
CPC .............. *H03K 3/012* (2013.01); *H03K 17/56* (2013.01)

(58) Field of Classification Search
CPC .......... H01L 27/0207; H01L 23/5286; H01L 27/11807; H01L 27/092; H01L 2027/11881; H01L 2924/00; H01L 2924/0002; H01L 23/5226; H01L 2027/11875; H01L 21/823475; H01L 23/5223; H01L 23/528; H01L 23/5283; H01L 27/0251; H01L 27/0292; H01L 27/118; H01L 27/11803; H01L 27/088; G06F 2119/06; G06F 30/392; G06F 30/398; G06F 30/394; G06F 30/39; G06F 1/26; G06F 1/28; G06F 2119/12; G06F 30/30; G06F 30/3308; G06F 30/337;
(Continued)

(56) References Cited

U.S. PATENT DOCUMENTS 9,917,041 B1 3/2018 Runyan et al.
9,978,682 B1 5/2018 Correale, Jr. et al.
(Continued)

FOREIGN PATENT DOCUMENTS

CN 109791925 A 5/2019
CN 114068581 A 2/2022
TW I739811 B 9/2021

*Primary Examiner* — Lincoln D Donovan
*Assistant Examiner* — Tyler J Pereny
(74) *Attorney, Agent, or Firm* — Merchant & Gould P.C.

(57) ABSTRACT

A device including a first supply voltage track, a second supply voltage track, a first reference track, a first standard cell, and a second standard cell. The first supply voltage track is configured to provide a first voltage and the second supply voltage track is configured to provide a second voltage that is greater than the first voltage. The first standard cell is configured to be electrically connected to the first supply voltage track to receive the first voltage and electrically connected to the first reference track. The second standard cell is configured to be electrically connected to the second supply voltage track to receive the second voltage and electrically connected to the first reference track.

20 Claims, 19 Drawing Sheets

(58) Field of Classification Search
CPC .......... G06F 30/396; H03K 19/018521; H03K 3/012; H03K 19/0016; H03K 17/56; H03K 19/0185; H03K 3/037; H03K 3/35613; H03K 17/687
See application file for complete search history.

(56) References Cited

U.S. PATENT DOCUMENTS

| | | |
|---|---|---|
| 10,128,234 B2 | 11/2018 | Fan et al. |
| 11,942,941 B2 | 3/2024 | Ou et al. |
| 11,948,886 B2 | 4/2024 | Wu et al. |
| 2015/0325563 A1* | 11/2015 | Kamal .................. H03K 3/012 257/351 |
| 2018/0203971 A1 | 7/2018 | Vedantam et al. |
| 2020/0050728 A1* | 2/2020 | Kim ...................... G06F 30/392 |
| 2020/0134121 A1 | 4/2020 | Lin et al. |
| 2021/0232168 A1 | 7/2021 | Mori et al. |
| 2022/0271742 A1 | 8/2022 | Park et al. |

* cited by examiner

MULTIPLE SUPPLY VOLTAGE TRACKS AND STANDARD CELLS

CROSS-REFERENCE TO RELATED APPLICATIONS

This application is a continuation of U.S. patent application Ser. No. 17/873,952, filed on Jul. 26, 2022, which application is incorporated herein by reference in its entirety.

BACKGROUND

Typically, an integrated circuit (IC) provides a supply voltage, such as supply voltage VDD, and a reference voltage, such as reference voltage VSS, to logic circuits in the integrated circuit to provide power to the logic circuits. Some integrated circuits include standard cell logic circuits, i.e., standard cells, that perform logic functions, such as AND, OR, NOT, NAND, and NOR gate logic functions. These standard cells are electrically connected to the supply voltage and the reference voltage, and inter-connected to one another to perform the functions of the integrated circuit. As integrated circuits evolve, circuit designers continue searching for ways to improve the power, performance, and area (PPA) of an integrated circuit by reducing power consumption, improving speed performance, and reducing area used on the integrated circuit.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion. In addition, the drawings are illustrative as examples of embodiments of the disclosure and are not intended to be limiting.

DETAILED DESCRIPTION

Figure 1:
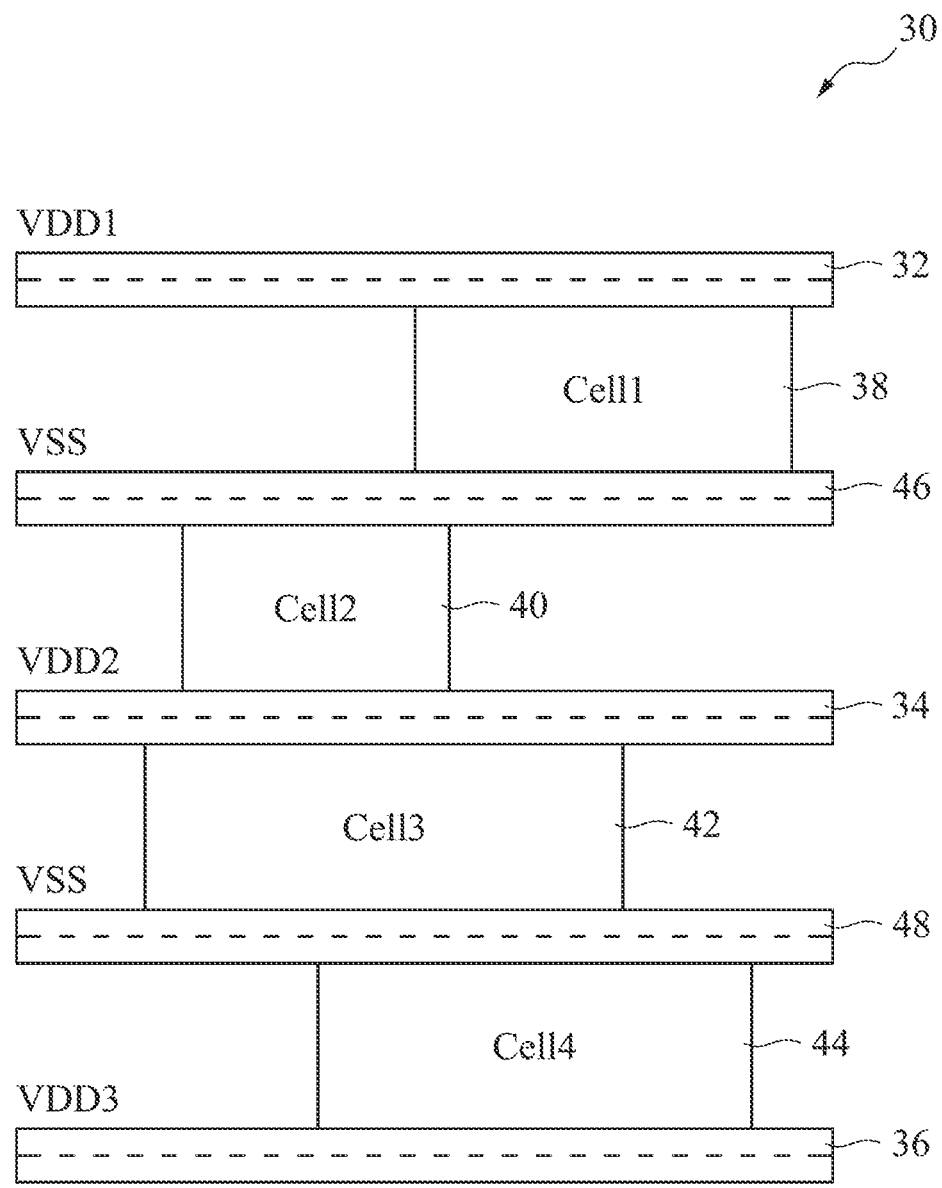
FIG. 1 is a diagram schematically illustrating a semiconductor device that includes multiple supply voltage tracks and multiple standard cells, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As integrated circuits evolve to include low and ultra-low voltage circuits, the circuits evolve to include lower supply voltages that reduce power consumption. However, lowering supply voltages increases circuit variations, such as timing variations. In standard cells, lowering the supply voltage exponentially increases timing delays through the standard cells and increases timing delay variations, such that the timing delay variations dominate the total delay time through the standard cells. In these standard cell circuits, the timing delay variation, i.e., the sigma of the timing delay, is much greater than the mean value of the timing delay.

Timing variations can be improved by lowering threshold voltages Vt and/or increasing the size of the standard cells. However, lowering threshold voltages Vt and/or increasing the size of the standard cells increases the dynamic and leakage power consumption of the standard cells and the area used by the standard cells on the integrated circuit, leaving the circuit designer with power and area issues. Thus, with lower supply voltages it is difficult to achieve timing convergence while still satisfying power consumption and area constraints. This trade-off between timing delays and variations versus power consumption and area constraints creates a challenge for improving PPA in the low and ultra-low voltage circuits.

Disclosed embodiments thus provide a semiconductor device, such as an integrated circuit, that includes multiple supply voltage tracks, where each of the multiple supply voltage tracks is configured to provide at least one different supply voltage. The disclosed embodiments further provide standard cells configured to be electrically connected to a supply voltage track to receive at least one supply voltage and to a reference track to receive a reference voltage, such as ground. In some embodiments, one or more of the multiple supply voltage tracks is configured to provide two or more different supply voltages. In some embodiments, the standard cells are electrically connected to a supply voltage track to receive one supply voltage. In some embodiments, the standard cells are electrically connected to a supply voltage track to receive two or more supply voltages.

Advantages of the disclosed embodiments include providing multiple different supply voltages to the standard cells for optimizing the trade-off between timing delays/variations versus power consumption and area constraints. Standard cells, including devices in the standard cells, that receive higher supply voltages provide decreased timing delays and decreased timing variations, but increased power consumption and/or leakage. Standard cells, including devices in the standard cells, that receive lower supply voltages provide increased timing delays and increased timing variations, but reduced power consumption and/or leakage.

Disclosed embodiments also include multiple standard cell libraries, where each of the multiple standard cell libraries is for a different supply voltage. The standard cells in one of the multiple standard cell libraries are identified for use with the supply voltage corresponding to the standard cell library. Also, standard cells that perform the same function that are in different standard cell libraries are labeled for use with the supply voltage that corresponds to their standard cell library.

Disclosed embodiments further include devices that include a plurality of tiles, where each of the tiles includes multiple different supply voltage tracks. In some embodiments, a first tile includes a first combination of supply voltage tracks, and a second tile includes a second combination of supply voltage tracks that is different from the first combination of supply voltage tracks. In some embodiments, a device includes a higher speed tile that includes two or more first supply voltage tracks that each provide a first voltage and at least one second supply voltage track that provides a second voltage that is less than the first voltage, wherein the higher speed tile includes more first supply voltage tracks than second supply voltage tracks. In some embodiments, a device includes a lower power tile that includes at least one first supply voltage track that provides a first voltage and two or more second supply voltage tracks that provide a second voltage that is less than the first voltage, wherein the lower power tile includes fewer first supply voltage tracks than second supply voltage tracks.

Disclosed embodiments further include a method of manufacturing an integrated circuit that includes generating multiple versions of standard cell libraries that are each for a different supply voltage; generating a supply voltage floorplan that includes a plurality of tiles that each include multiple supply voltage tracks; placing the standard cells from the multiple versions of standard cell libraries on the tiles; routing conductive nets between the standard cells; and providing a routed result of the integrated circuit.

FIG. 1 is a diagram schematically illustrating a semiconductor device 30 that includes multiple supply voltage tracks 32, 34, and 36 and multiple standard cells 38, 40, 42, and 44, in accordance with some embodiments. In some embodiments, the standard cells 38, 40, 42, and 44 are logic gates that perform logic functions, such as AND, OR, NOT, NAND, and NOR logic functions. In some embodiments, the semiconductor device 30 is an integrated circuit.

The semiconductor device 30 includes the multiple supply voltage tracks 32, 34, and 36 and two reference voltage tracks 46 and 48. Each of the multiple supply voltage tracks 32, 34, and 36 is configured to provide one different supply voltage. Supply voltage track 32 is configured to provide supply voltage VDD1, supply voltage track 34 is configured to provide supply voltage VDD2, and supply voltage track 36 is configured to provide supply voltage VDD3. Each of the reference voltage tracks 46 and 48 provides a reference voltage VSS, such as ground. In some embodiments, the supply voltage VDD1 is greater than the supply voltage VDD2, and the supply voltage VDD2 is greater than the supply voltage VDD3. In some embodiments, the supply voltage VDD1 is less than the supply voltage VDD2, and the supply voltage VDD2 is less than the supply voltage VDD3. In other embodiments, the supply voltages VDD1, VDD2, and VDD3 can compare to one another differently, such as the supply voltage VDD2 being greater than the supply voltage VDD1, and the supply voltage VDD1 being greater than the supply voltage VDD3, or the supply voltage VDD2 being less than the supply voltage VDD1, and the supply voltage VDD1 being less than the supply voltage VDD3. In other embodiments, each of the multiple supply voltage tracks 32, 34, and 36 is configured to provide one or more other or different supply voltages than those depicted in FIG. 1.

The standard cells 38, 40, 42, and 44 are configured to be electrically connected to the supply voltage tracks 32, 34, and 36. Each of the standard cells 38, 40, 42, and 44 is electrically connected to one of the supply voltage tracks 32, 34, and 36 and to one of the reference voltage tracks 46 and 48. The standard cell Cell1 38 is electrically connected to the supply voltage track 32 to receive supply voltage VDD1 and to the first reference voltage track 46. The standard cell Cell2 40 is electrically connected to the supply voltage track 34 to receive supply voltage VDD2 and to the first reference voltage track 46. The standard cell Cell3 42 is electrically connected to the supply voltage track 34 to receive supply voltage VDD2 and to the second reference voltage track 48. The standard cell Cell4 44 is electrically connected to the supply voltage track 36 to receive supply voltage VDD3 and to the second reference voltage track 48.

The standard cells 38, 40, 42, and 44 are electrically connected to different supply voltage tracks 32, 34, and 36 to receive different supply voltages VDD1, VDD2, and VDD3 to optimize the trade-offs between timing delays/variations versus power consumption and area constraints in the semiconductor device 30. Standard cells, including devices in the standard cells, that receive higher supply voltages provide decreased timing delays and decreased timing variations, but increased power consumption and/or leakage. Standard cells, including devices in the standard cells, that receive lower supply voltages provide increased timing delays and increased timing variations, but reduced power consumption and/or leakage.

Figure 2:
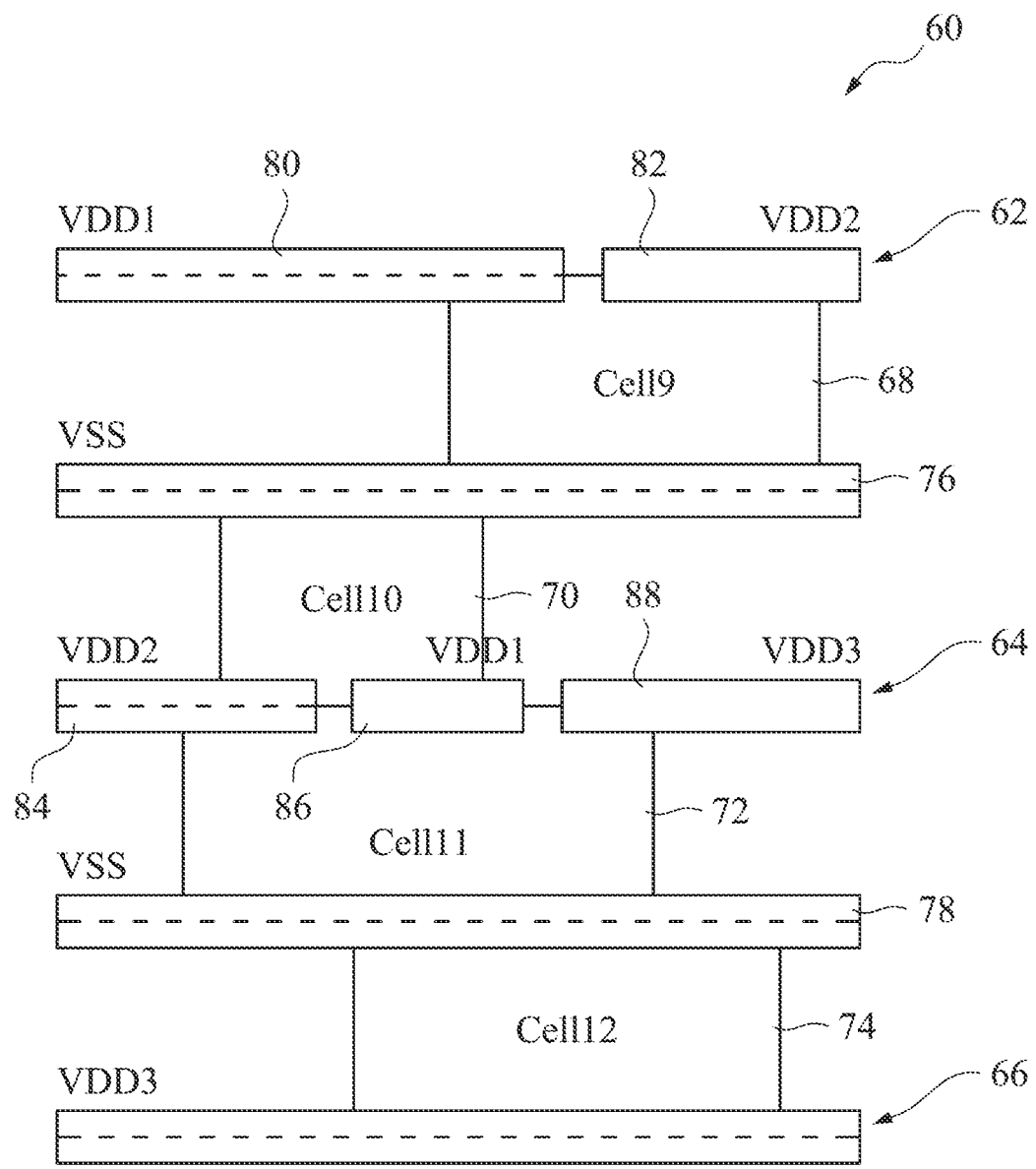
FIG. 2 is a diagram schematically illustrating a semiconductor device that includes multiple supply voltage tracks including supply voltage tracks that provide more than one supply voltage, in accordance with some embodiments.

FIG. 2 is a diagram schematically illustrating a semiconductor device 60 that includes multiple supply voltage tracks 62, 64, and 66 including supply voltage tracks 62 and 64 that provide more than one supply voltage, in accordance with some embodiments. The semiconductor device 60 further includes multiple standard cells 68, 70, 72, and 74 that perform logic functions, such as AND, OR, NOT, NAND, and NOR logic functions. The multiple standard cells 68, 70, 72, and 74 include the standard cells 68, 70, and 72 that are configured to receive more than one supply voltage. In some embodiments, the semiconductor device 60 is an integrated circuit.

The semiconductor device 60 includes the multiple supply voltage tracks 62, 64, and 66 and two reference voltage tracks 76 and 78. Each of the multiple supply voltage tracks 62, 64, and 66 is configured to provide one or more supply voltages. Supply voltage track 62 is configured to provide supply voltage VDD1 80 and supply voltage VDD2 82. Supply voltage track 64 is configured to provide supply voltage VDD2 84, supply voltage VDD1 86, and supply voltage VDD3 88. Supply voltage track 66 is configured to provide supply voltage VDD3. Each of the reference voltage tracks 76 and 78 provides a reference voltage VSS, such as ground. In some embodiments, the supply voltage VDD1 is greater than the supply voltage VDD2, and the supply voltage VDD2 is greater than the supply voltage VDD3. In some embodiments, the supply voltage VDD1 is less than the supply voltage VDD2, and the supply voltage VDD2 is less than the supply voltage VDD3. In other embodiments, the supply voltages VDD1, VDD2, and VDD3 can compare to one another differently, such as the supply voltage VDD2 being greater than the supply voltage VDD1, and the supply voltage VDD1 being greater than the supply voltage VDD3, or the supply voltage VDD2 being less than the supply voltage VDD1, and the supply voltage VDD1 being less than the supply voltage VDD3. In other embodiments, each of the multiple supply voltage tracks 62, 64, and 66 is configured to provide one or more other or different supply voltages than those depicted in FIG. 2.

The standard cells 68, 70, 72, and 74 are configured to be electrically connected to the supply voltage tracks 62, 64, and 66. The standard cells 68, 70, and 72 are electrically connected to supply voltage tracks 62 and 64 to receive two or more supply voltages. The standard cell Cell9 68 is electrically connected to the supply voltage track 62 to receive supply voltage VDD1 80 and supply voltage VDD2 82 and to the first reference voltage track 76. The standard cell Cell10 70 is electrically connected to the supply voltage track 64 to receive supply voltage VDD2 84 and supply voltage VDD1 86 and to the first reference voltage track 76. The standard cell Cell11 72 is electrically connected to the supply voltage track 64 to receive supply voltage VDD2 84, supply voltage VDD1 86, and supply voltage VDD3 88 and to the second reference voltage track 78. The standard cell Cell12 74 is electrically connected to the supply voltage track 66 to receive supply voltage VDD3 and to the second reference voltage track 78. In other embodiments, each of the standard cells 68, 70, 72, and 74 is electrically connected to receive one or more other or different supply voltages than those depicted in FIG. 2.

The standard cells 68, 70, 72, and 74 are electrically connected to different supply voltage tracks 62, 64, and 66 to receive the different supply voltages VDD1, VDD2, and VDD3 to optimize the trade-offs between timing delays/variations versus power consumption and area constraints in the semiconductor device 60. Standard cells, including devices in the standard cells, that receive higher supply voltages provide decreased timing delays and decreased timing variations, but increased power consumption and/or leakage. Standard cells, including devices in the standard cells, that receive lower supply voltages provide increased timing delays and increased timing variations, but reduced power consumption and/or leakage.

Figure 3:
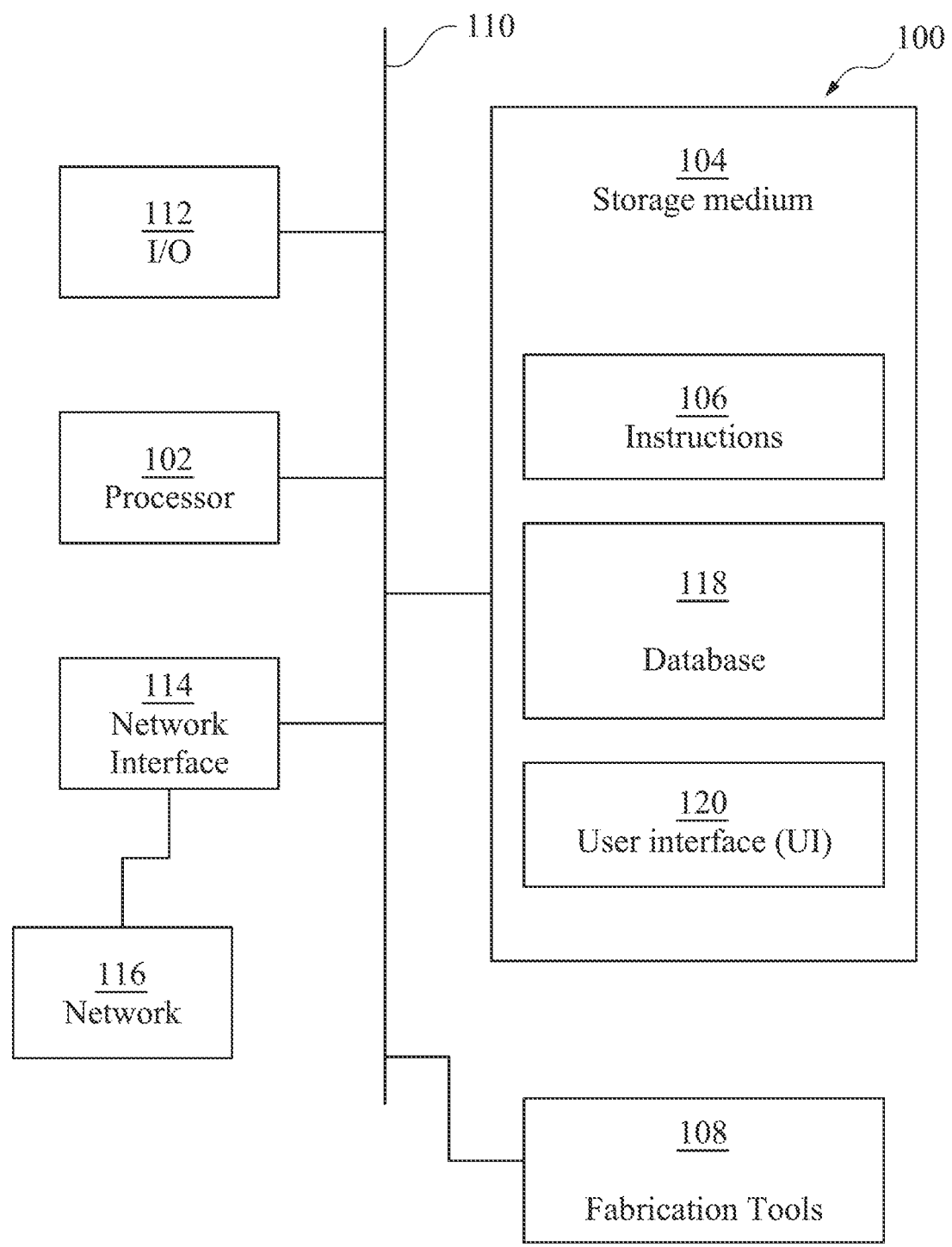
FIG. 3 is a diagram schematically illustrating an example of a computer system that is configured to provide the semiconductor devices and methods of the current disclosure, in accordance with some embodiments.

FIG. 3 is a block diagram illustrating an example of a computer system 100 configured to provide the semiconductor devices and methods of the current disclosure, including the semiconductors devices 30 and 60 of FIGS. 1 and 2, respectively, in accordance with some embodiments. Some or all the design and manufacture of the semiconductor devices can be performed by or with the computer system 100. In some embodiments, the computer system 100 includes an EDA system. In some embodiments, the semiconductor devices are ICs.

In some embodiments, the system 100 is a general-purpose computing device including a processor 102 and a non-transitory, computer-readable storage medium 104. The computer-readable storage medium 104 may be encoded with, e.g., store, computer program code such as executable instructions 106. Execution of the instructions 106 by the processor 102 provides (at least in part) a design tool that implements a portion or all the functions of the system 100, such as the pre-layout simulations, post-layout simulations, routing, rerouting, and final layout for manufacturing. Further, fabrication tools 108 are included to further layout and physically implement the design and manufacture of the semiconductor devices. In some embodiments, the system 100 includes a commercial router. In some embodiments, the system 100 includes an APR system.

The processor 102 is electrically coupled to the computer-readable storage medium 104 by a bus 110 and to an I/O interface 112 by the bus 110. A network interface 114 is also electrically connected to the processor 102 by the bus 110. The network interface 114 is connected to a network 116, so that the processor 102 and the computer-readable storage medium 104 can connect to external elements using the network 116. The processor 102 is configured to execute the computer program code or instructions 106 encoded in the computer-readable storage medium 104 to cause the system 100 to perform a portion or all the functions of the system 100, such as providing the semiconductor devices and methods of the current disclosure and other functions of the system 100. In some embodiments, the processor 102 is a central processing unit (CPU), a multi-processor, a distributed processing system, an application specific integrated circuit (ASIC), and/or a suitable processing unit.

In some embodiments, the computer-readable storage medium 104 is an electronic, magnetic, optical, electromagnetic, infrared, and/or semiconductor system or apparatus or device. For example, the computer-readable storage medium 104 can include a semiconductor or solid-state memory, a magnetic tape, a removable computer diskette, a random-access memory (RAM), a read-only memory (ROM), a rigid magnetic disk, and/or an optical disk. In some embodiments using optical disks, the computer-readable storage medium 104 can include a compact disk, read only memory (CD-ROM), a compact disk read/write memory (CD-R/W), and/or a digital video disc (DVD).

In some embodiments, the computer-readable storage medium 104 stores computer program code or instructions 106 configured to cause the system 100 to perform a portion or all the functions of the system 100. In some embodiments, the computer-readable storage medium 104 also stores information which facilitates performing a portion or all the functions of the system 100. In some embodiments, the computer-readable storage medium 104 stores a database 118 that includes one or more of component libraries, digital circuit cell libraries, and databases.

The EDA system 100 includes the I/O interface 112, which is coupled to external circuitry. In some embodiments, the I/O interface 112 includes a keyboard, keypad, mouse, trackball, trackpad, touchscreen, and/or cursor direction keys for communicating information and commands to the processor 102.

The network interface 114 is coupled to the processor 102 and allows the system 100 to communicate with the network 116, to which one or more other computer systems are connected. The network interface 114 can include: wireless network interfaces such as BLUETOOTH, WIFI, WIMAX, GPRS, or WCDMA; or wired network interfaces such as ETHERNET, USB, or IEEE-1364. In some embodiments, a portion or all the functions of the system 100 can be performed in two or more systems that are like system 100.

The system 100 is configured to receive information through the I/O interface 112. The information received through the I/O interface 112 includes one or more of instructions, data, design rules, libraries of components and cells, and/or other parameters for processing by processor 102. The information is transferred to the processor 102 by the bus 110. Also, the system 100 is configured to receive information related to a user interface (UI) through the I/O interface 112. This UI information can be stored in the computer-readable storage medium 104 as a UI 120.

In some embodiments, a portion or all the functions of the system 100 are implemented via a standalone software application for execution by a processor. In some embodiments, a portion or all the functions of the system 100 are implemented in a software application that is a part of an additional software application. In some embodiments, a portion or all the functions of the system 100 are implemented as a plug-in to a software application. In some embodiments, at least one of the functions of the system 100 is implemented as a software application that is a portion of an EDA tool. In some embodiments, a portion or all the functions of the system 100 are implemented as a software application that is used by the system 100. In some embodiments, a layout diagram is generated using a tool such as VIRTUOSO available from CADENCE DESIGN SYSTEMS, Inc., or another suitable layout generating tool.

In some embodiments, the variable track based NDR routing, layouts, and other processes are realized as functions of a program stored in a non-transitory computer readable recording medium. Examples of a non-transitory computer readable recording medium include, but are not limited to, external/removable and/or internal/built-in storage or memory units, e.g., one or more optical disks such as a DVD, a magnetic disk such as a hard disk, a semiconductor memory such as a ROM and RAM, and a memory card, and the like.

As noted above, embodiments of the system 100 include fabrication tools 108 for implementing the manufacturing processes of the system 100. For example, based on the final layout, photolithographic masks may be generated, which are used to fabricate the semiconductor device by the fabrication tools 108.

Figure 4:
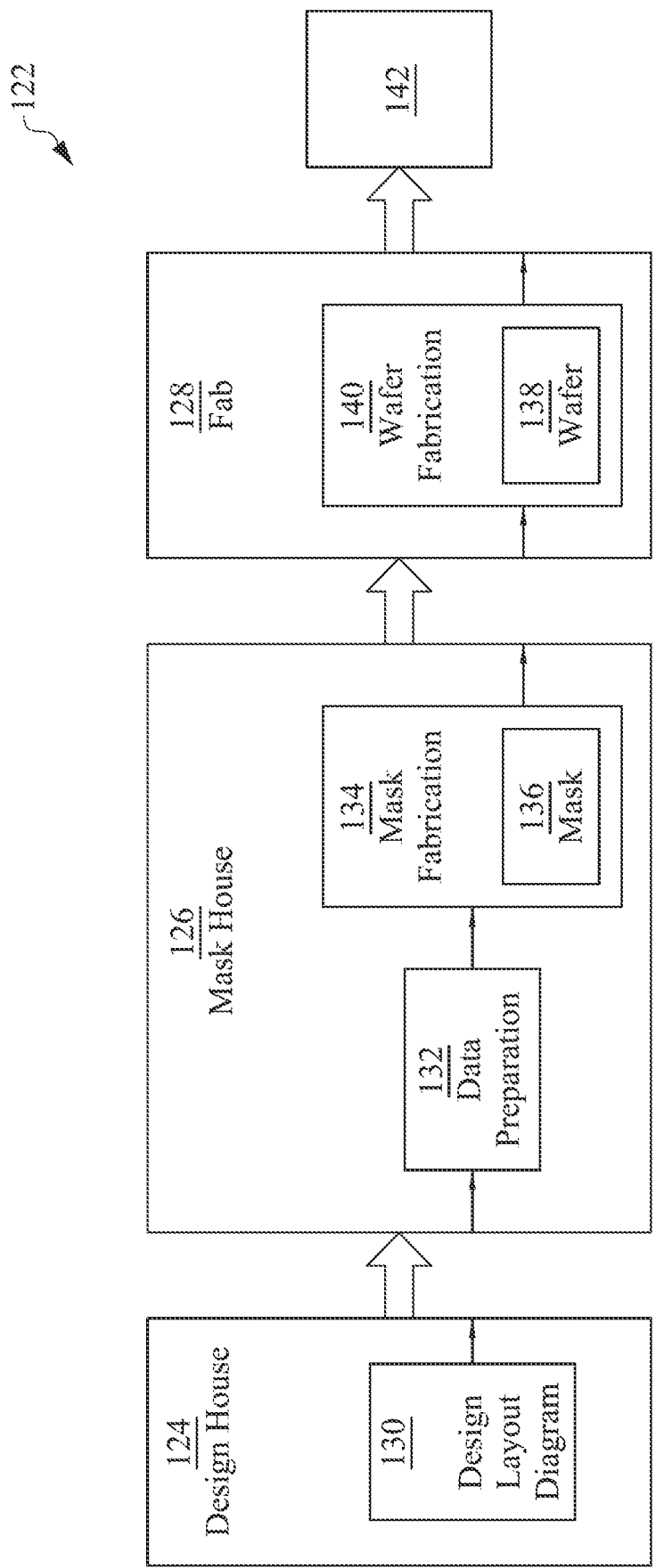
FIG. 4 is a diagram schematically illustrating a semiconductor device manufacturing system and a semiconductor device manufacturing flow associated therewith, in accordance with some embodiments.

Further aspects of device fabrication are disclosed in conjunction with FIG. 4, which is a block diagram of a semiconductor device manufacturing system 122 and a semiconductor device manufacturing flow associated therewith, in accordance with some embodiments. In some embodiments, based on a layout diagram, one or more semiconductor masks and/or at least one component in a layer of a semiconductor device is fabricated using the manufacturing system 122.

In FIG. 4, the semiconductor device manufacturing system 122 includes entities, such as a design house 124, a mask house 126, and a semiconductor device manufacturer/fabricator ("Fab") 128, that interact with one another in the design, development, and manufacturing cycles and/or services related to manufacturing a semiconductor device, such as the semiconductor devices described herein. The entities in the system 122 are connected by a communications network. In some embodiments, the communications network is a single network. In some embodiments, the communications network is a variety of different networks, such as an intranet and the internet. The communications network includes wired and/or wireless communication channels. Each entity interacts with one or more of the other entities and provides services to and/or receives services from one or more of the other entities. In some embodiments, two or more of the design house 124, the mask house 126, and the semiconductor device fab 128 are owned by a single larger company. In some embodiments, two or more of the design house 124, the mask house 126, and the semiconductor device fab 128 coexist in a common facility and use common resources.

The design house (or design team) 124 generates a semiconductor device design layout diagram 130. The semiconductor device design layout diagram 130 includes various geometrical patterns, or semiconductor device layout diagrams designed for a semiconductor device. The geometrical patterns correspond to patterns of metal, oxide, or semiconductor layers that make up the various components of the semiconductor structures to be fabricated. The various layers combine to form various semiconductor device features. For example, a portion of the semiconductor device design layout diagram 130 includes various semiconductor device features, such as diagonal vias, active areas or regions, gate electrodes, sources, drains, metal lines, local vias, and openings for bond pads, to be formed in a semiconductor substrate (such as a silicon wafer) and in various material layers disposed on the semiconductor substrate. The design house 124 implements a design procedure to form a semiconductor device design layout diagram 130. The semiconductor device design layout diagram 130 is presented in one or more data files having information of the geometrical patterns. For example, semiconductor device design layout diagram 130 can be expressed in a GDSII file format or DFII file format. In some embodiments, the design procedure includes one or more of analog circuit design, digital logic circuit design, standard cell circuit design, supply voltage track design, reference voltage track design, place and route routines, and physical layout designs.

The mask house 126 includes data preparation 132 and mask fabrication 134. The mask house 126 uses the semiconductor device design layout diagram 130 to manufacture one or more masks 136 to be used for fabricating the various layers of the semiconductor device or semiconductor structure. The mask house 126 performs mask data preparation 132, where the semiconductor device design layout diagram 130 is translated into a representative data file (RDF). The mask data preparation 132 provides the RDF to the mask fabrication 134. The mask fabrication 134 includes a mask writer that converts the RDF to an image on a substrate, such as a mask (reticle) 136 or a semiconductor wafer 138. The design layout diagram 130 is manipulated by the mask data preparation 132 to comply with characteristics of the mask writer and/or criteria of the semiconductor device fab 128. In FIG. 4, the mask data preparation 132 and the mask fabrication 134 are illustrated as separate elements. In some embodiments, the mask data preparation 132 and the mask fabrication 134 can be collectively referred to as mask data preparation.

In some embodiments, the mask data preparation 132 includes an optical proximity correction (OPC) which uses lithography enhancement techniques to compensate for image errors, such as those that can arise from diffraction, interference, other process effects and the like. The OPC adjusts the semiconductor device design layout diagram 130. In some embodiments, the mask data preparation 132 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, the mask data preparation 132 includes a mask rule checker (MRC) that checks the semiconductor device design layout diagram 130 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the semiconductor device design layout diagram 130 to compensate for limitations during the mask fabrication 134, which may undo part of the modifications performed by OPC to meet mask creation rules.

In some embodiments, the mask data preparation 132 includes lithography process checking (LPC) that simulates processing that will be implemented by the semiconductor device fab 128. LPC simulates this processing based on the semiconductor device design layout diagram 130 to create a simulated manufactured device. The processing parameters in LPC simulation can include parameters associated with various processes of the semiconductor device manufacturing cycle, parameters associated with tools used for manufacturing the semiconductor device, and/or other aspects of the manufacturing process. LPC considers various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine the semiconductor device design layout diagram 130.

The above description of mask data preparation 132 has been simplified for the purposes of clarity. In some embodiments, data preparation 132 includes additional features such as a logic operation (LOP) to modify the semiconductor device design layout diagram 130 according to manufacturing rules. Additionally, the processes applied to the semiconductor device design layout diagram 130 during data preparation 132 may be executed in a variety of different orders.

After the mask data preparation 132 and during the mask fabrication 134, a mask 136 or a group of masks 136 are fabricated based on the modified semiconductor device design layout diagram 130. In some embodiments, the mask fabrication 134 includes performing one or more lithographic exposures based on the semiconductor device design layout diagram 130. In some embodiments, an electron-beam (e-beam) or a mechanism of multiple e-beams is used to form a pattern on a mask (photomask or reticle) 136 based on the modified semiconductor device design layout diagram 130. The mask 136 can be formed in various technologies. In some embodiments, the mask 136 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region, and transmits through the transparent regions. In one example, a binary mask version of the mask 136 includes a transparent substrate (e.g., fused quartz) and an opaque material (e.g., chromium) coated in the opaque regions of the binary mask. In another example, the mask 136 is formed using a phase shift technology. In a phase shift mask (PSM) version of the mask 136, various features in the pattern formed on the phase shift mask are configured to have proper phase difference to enhance the resolution and imaging quality. In various examples, the phase shift mask can be attenuated PSM or alternating PSM. The mask(s) generated by the mask fabrication 134 is used in a variety of processes. For example, such a mask(s) is used in an ion implantation process to form various doped regions in the semiconductor wafer 138, in an etching process to form various etching regions in the semiconductor wafer 138, and/or in other suitable processes.

The semiconductor device fab 128 includes wafer fabrication 140. The semiconductor device fab 128 is a semiconductor device fabrication business that includes one or more manufacturing facilities for the fabrication of a variety of different semiconductor device products. In some embodiments, the semiconductor device fab 128 is a semiconductor foundry. For example, there may be a manufacturing facility for the front end of line (FEOL) fabrication of a plurality of semiconductor device products, while a second manufacturing facility may provide the back end of line (BEOL) fabrication for the interconnection and packaging of the semiconductor device products, and a third manufacturing facility may provide other services for the foundry business.

The semiconductor device fab 128 uses the mask(s) 136 fabricated by the mask house 126 to fabricate the semiconductor structures or semiconductor devices 142 of the current disclosure. Thus, the semiconductor device fab 128 at least indirectly uses the semiconductor device design layout diagram 130 to fabricate the semiconductor structures or semiconductor devices 142 of the current disclosure. Also, the semiconductor wafer 138 includes a silicon substrate or other proper substrate having material layers formed thereon, and the semiconductor wafer 138 further includes one or more of various doped regions, dielectric features, multilevel interconnects, and the like (formed at subsequent manufacturing steps). In some embodiments, the semiconductor wafer 138 is fabricated by the semiconductor device fab 128 using the mask(s) 136 to form the semiconductor structures or semiconductor devices 142 of the current disclosure. In some embodiments, the semiconductor device fabrication includes performing one or more lithographic exposures based at least indirectly on the semiconductor device design layout diagram 130.

As described above, the semiconductor device 30 of FIG. 1 includes multiple supply voltage tracks 32, 34, and 36, two reference voltage tracks 46 and 48, and multiple standard cells 38, 40, 42, and 44, where each of the multiple supply voltage tracks 32, 34, and 36 is configured to provide a different supply voltage.

Figure 5:
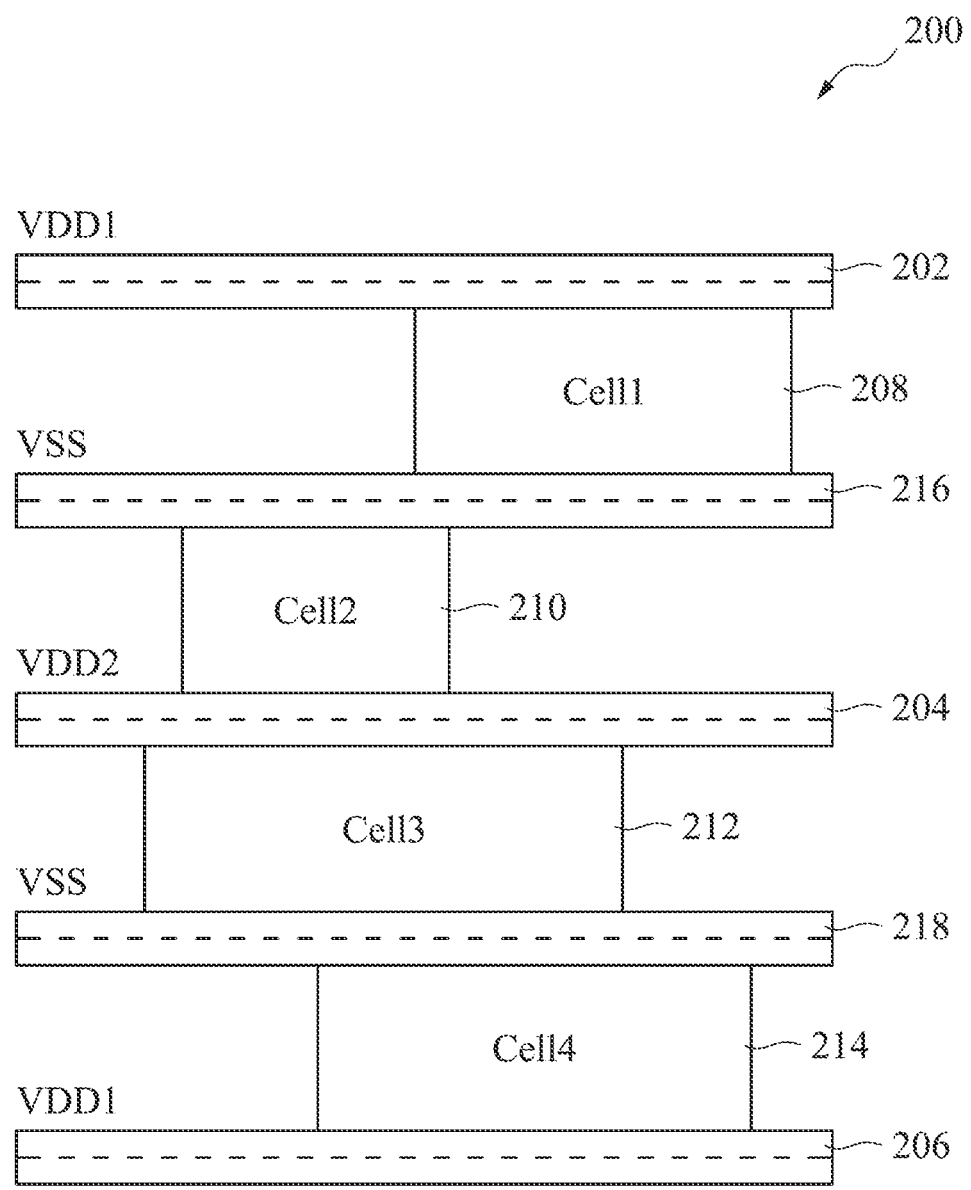
FIG. 5 is a diagram schematically illustrating a semiconductor device that includes multiple supply voltage tracks including supply voltage tracks that provide the same supply voltage, in accordance with some embodiments.

FIG. 5 is a diagram schematically illustrating a semiconductor device 200 that includes multiple supply voltage tracks 202, 204, and 206 including supply voltage tracks 202 and 206 that provide the same supply voltage VDD1, in accordance with some embodiments. Also, the semiconductor device 200 includes multiple standard cells 208, 210, 212, and 214 where, in some embodiments, the standard cells 208, 210, 212, and 214 are like the standard cells 38, 40, 42, and 44 (shown in FIG. 1), respectively, except standard cell 214 is configured to receive supply voltage VDD1 instead of supply voltage VDD3. In some embodiments, the multiple standard cells 208, 210, 212, and 214 are logic gates that perform logic functions, such as AND, OR, NOT, NAND, and NOR logic functions. In some embodiments, the semiconductor device 200 is an integrated circuit.

The semiconductor device 200 includes the multiple supply voltage tracks 202, 204, and 206 and two reference voltage tracks 216 and 218. Supply voltage track 202 is configured to provide supply voltage VDD1, supply voltage track 204 is configured to provide supply voltage VDD2, and supply voltage track 206 is configured to provide supply voltage VDD1. Each of the reference voltage tracks 216 and 218 provides a reference voltage VSS, such as ground. In some embodiments, the supply voltage VDD1 is greater than the supply voltage VDD2. In some embodiments, the supply voltage VDD1 is less than the supply voltage VDD2. In some embodiments, the supply voltage VDD1 is greater than the supply voltage VDD2 by 10 millivolts (mV). In some embodiments, the supply voltage VDD1 is less than the supply voltage VDD2 by 10 millivolts (mV). In other embodiments, at least one of the multiple supply voltage tracks 202, 204, and 206 is configured to provide one or more other or different supply voltages than those depicted in FIG. 5.

The standard cells 208, 210, 212, and 214 are configured to be electrically connected to the supply voltage tracks 202, 204, and 206. Each of the standard cells 208, 210, 212, and 214 is electrically connected to one of the supply voltage tracks 202, 204, and 206 and to one of the reference voltage tracks 216 and 218. The standard cell Cell1 208 is electrically connected to the supply voltage track 202 to receive supply voltage VDD1 and to the first reference voltage track 216. The standard cell Cell2 210 is electrically connected to the supply voltage track 204 to receive supply voltage VDD2 and to the first reference voltage track 216. The standard cell Cell3 212 is electrically connected to the supply voltage track 204 to receive supply voltage VDD2 and to the second reference voltage track 218. The standard cell Cell4 214 is electrically connected to the supply voltage track 206 to receive supply voltage VDD1 and to the second reference voltage track 218. In some embodiments, the standard cell Cell4 214 is a different version of the standard cell Cell4 44 (shown in FIG. 1), where the standard cell Cell4 214 is configured to receive the supply voltage VDD1 and the standard cell Cell4 44 is configured to receive the supply voltage VDD3. In other embodiments, one or more of the standard cells 208, 210, 212, and 214 is configured to receive a different supply voltage.

The standard cells 208, 210, 212, and 214 are electrically connected to different supply voltage tracks 202, 204, and 206 to receive the different supply voltages VDD1 and VDD2 to optimize the trade-offs between timing delays/variations versus power consumption and area constraints in the semiconductor device 200. In some embodiments, a standard cell, such as one of the standard cells 208, 210, 212, and 214, has multiple versions for trading-off between timing delays, timing variations, and power consumption. In some embodiments, a standard cell, such as one of the standard cells 208, 210, 212, and 214, has multiple versions of the standard cell where each version of the standard cell is configured to receive a different supply voltage. For example, in some embodiments VDD2 is greater than VDD1 by 10 mV, such that a version of the standard cell that receives VDD2 instead of VDD1 has much smaller timing variations and only a small increase in power consumption. Such as in ultra-low voltage range devices.

Figure 6:
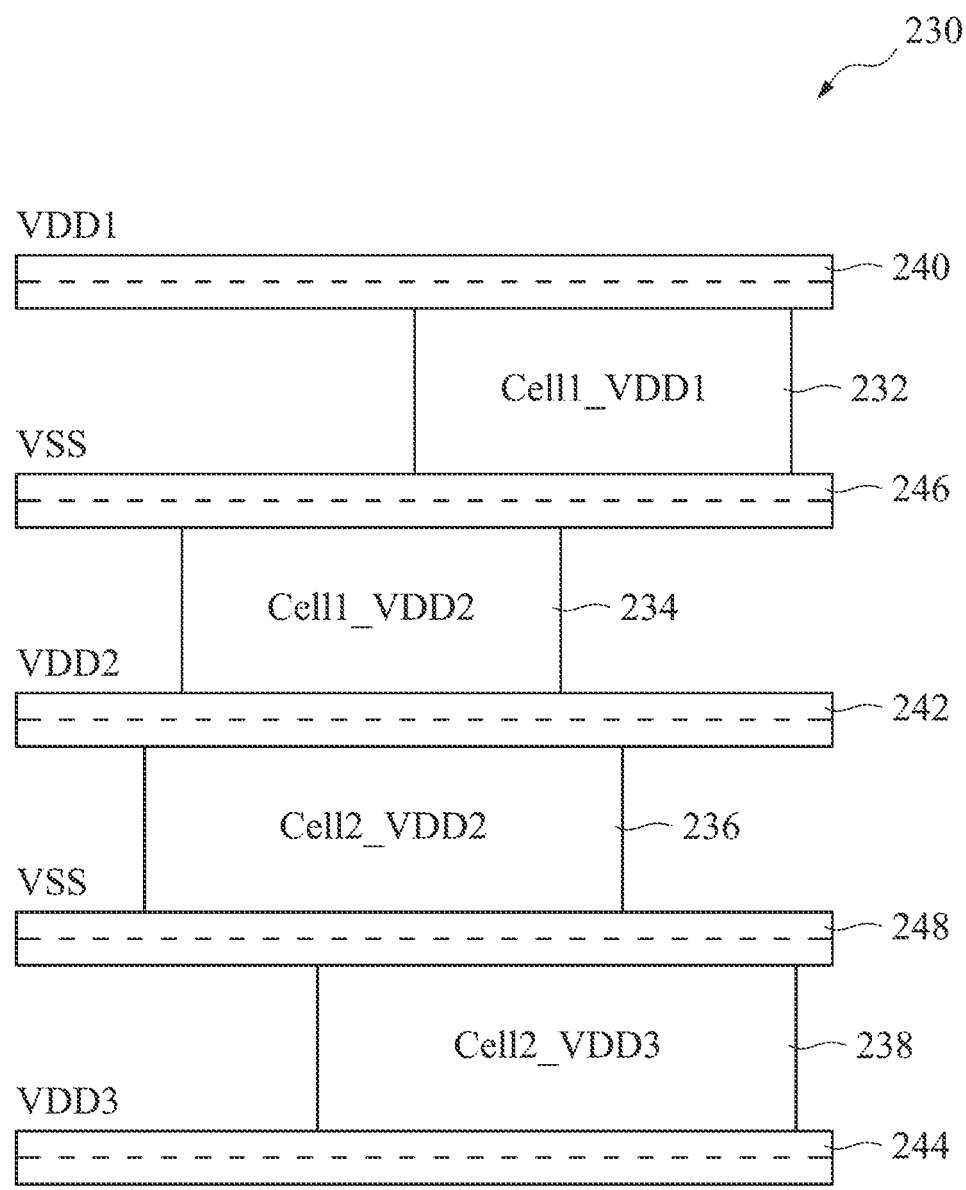
FIG. 6 is a diagram schematically illustrating a semiconductor device that includes standard cells from different versions of a standard cell library, in accordance with some embodiments.

FIG. 6 is a diagram schematically illustrating a semiconductor device 230 that includes standard cells 232, 234, 236, and 238 from different versions of a standard cell library, in accordance with some embodiments. Each of the different versions of the standard cell library provides standard cells configured to receive power from a selected power supply voltage. Each of the standard cells in one version of the standard cell library has a name that includes the power supply voltage of the version of the standard cell library. In some embodiments, the multiple standard cells 232, 234, 236, and 238 are logic gates that perform logic functions, such as AND, OR, NOT, NAND, and NOR logic functions. In some embodiments, the semiconductor device 230 is an integrated circuit.

Each of the standard cells 232, 234, 236, and 238 is configured to perform the standard cell function that is indicated in its name and to receive the supply voltage that is indicated in its name. The standard cell 232 is standard cell Cell1_VDD1 that performs a Cell1 function and is configured to receive the supply voltage VDD1, and the standard cell 234 is standard cell Cell1_VDD2 that performs the Cell1 function and is configured to receive the supply voltage VDD2. Thus, the standard cells 232 and 234 perform the same Cell1 function, but the standard cell 232 is from a standard cell library version configured to be powered by supply voltage VDD1 and the standard cell 234 is from a standard cell library version configured to be powered by supply voltage VDD2.

The standard cell 236 is standard cell Cell2_VDD2 that performs a Cell2 function and is configured to receive the supply voltage VDD2, and the standard cell 238 is standard cell Cell2_VDD3 that performs the Cell2 function and is configured to receive the supply voltage VDD3. Thus, the standard cells 236 and 238 perform the same Cell2 function, but the standard cell 236 is from the standard cell library version configured to be powered by supply voltage VDD2 and the standard cell 238 is from a standard cell library version configured to be powered by supply voltage VDD3. The standard cells 234 and 236 are from the same standard cell library version that is configured to be powered by the supply voltage VDD2.

The semiconductor device 230 includes multiple supply voltage tracks 240, 242, and 244 and reference voltage tracks 246 and 248. Supply voltage track 240 is configured to provide supply voltage VDD1, supply voltage track 242 is configured to provide supply voltage VDD2, and supply voltage track 244 is configured to provide supply voltage VDD3. Each of the reference voltage tracks 246 and 248 provides a reference voltage VSS, such as ground. In some embodiments, the supply voltage VDD1 is greater than the supply voltage VDD2, and the supply voltage VDD2 is greater than the supply voltage VDD3. In some embodiments, the supply voltage VDD1 is less than the supply voltage VDD2, and the supply voltage VDD2 is less than the supply voltage VDD3. In other embodiments, the supply voltages VDD1, VDD2, and VDD3 can compare to one another differently, such as the supply voltage VDD2 being greater than the supply voltage VDD1, and the supply voltage VDD1 being greater than the supply voltage VDD3, or the supply voltage VDD2 being less than the supply voltage VDD1, and the supply voltage VDD1 being less than the supply voltage VDD3. In other embodiments, at least one of the multiple supply voltage tracks 240, 242, and 244 is configured to provide one or more other or different supply voltages than those depicted in FIG. 6.

The standard cells 232, 234, 236, and 238 are configured to be electrically connected to the supply voltage tracks 240, 242, and 244. Each of the standard cells 232, 234, 236, and 238 is electrically connected to one of the supply voltage tracks 240, 242, and 244 and to one of the reference voltage tracks 246 and 248. The standard cell 232 is electrically connected to the supply voltage track 240 to receive supply voltage VDD1 and to the first reference voltage track 246. The standard cell 234 is electrically connected to the supply voltage track 242 to receive supply voltage VDD2 and to the first reference voltage track 246. The standard cell 236 is electrically connected to the supply voltage track 242 to receive supply voltage VDD2 and to the second reference voltage track 248. The standard cell 238 is electrically connected to the supply voltage track 244 to receive supply voltage VDD3 and to the second reference voltage track 248.

The standard cells 232, 234, 236, and 238 are provided from selected versions of the standard cell library and electrically connected to different supply voltage tracks 240, 242, and 244 to receive the different supply voltages VDD1, VDD2, and VDD3 and optimize the trade-offs between timing delays/variations versus power consumption and area constraints in the semiconductor device 230. The standard cells 232 and 234 are different supply voltage versions of a standard cell that performs the Cell1 function and the standard cells 236 and 238 are different supply voltage versions of a standard cell that performs the Cell2 function. The different supply voltage versions of these cell functions can be used for trade-offs between timing delays, timing variations, and power consumption.

Figure 7:
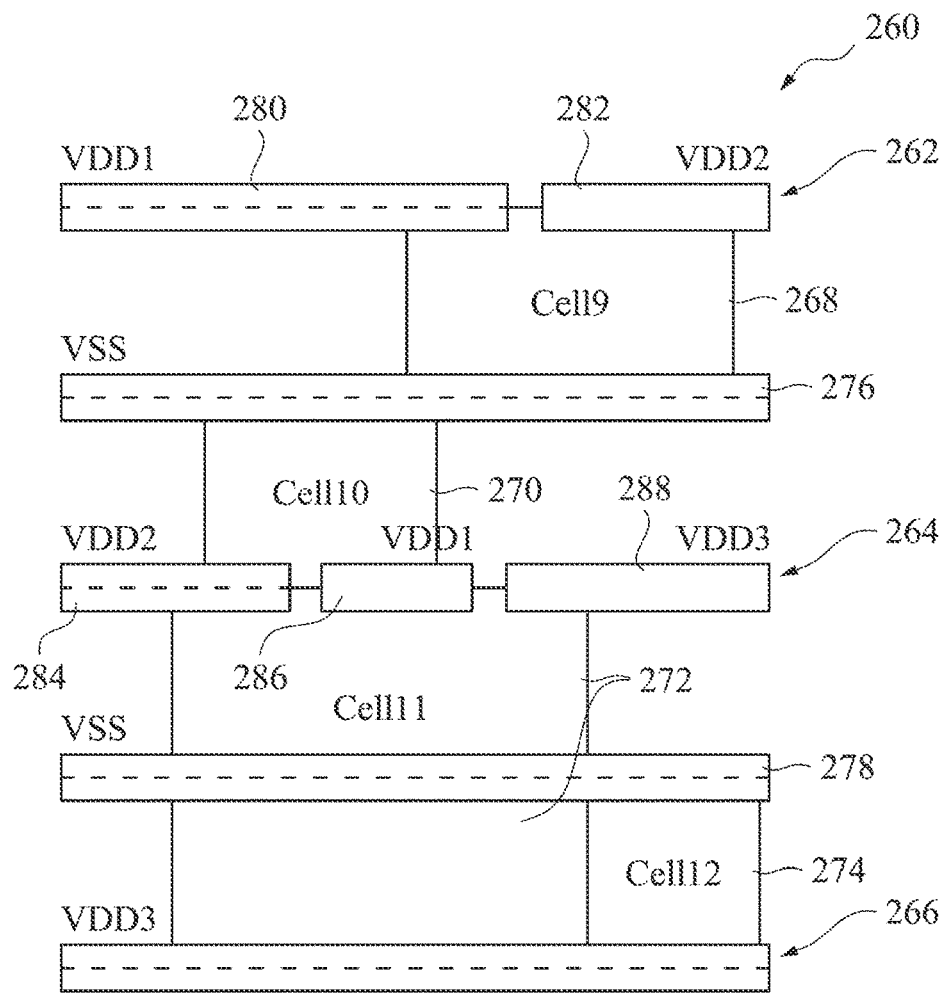
FIG. 7 is a diagram schematically illustrating a semiconductor device that includes supply voltage tracks including supply voltage tracks that provide more than one supply voltage and multiple standard cells including standard cells that receive more than one supply voltage, in accordance with some embodiments.

FIG. 7 is a diagram schematically illustrating a semiconductor device 260 that includes supply voltage tracks 262, 264, and 266 including supply voltage tracks 262 and 264 that provide more than one supply voltage and multiple standard cells 268, 270, 272, and 274 including standard cells 268, 270, and 272 that receive more than one supply voltage, in accordance with some embodiments. In some embodiments, the multiple standard cells 268, 270, 272, and 274 perform logic functions, such as AND, OR, NOT, NAND, and NOR logic functions. In some embodiments, the semiconductor device 260 is an integrated circuit.

The semiconductor device 260 includes the multiple supply voltage tracks 262, 264, and 266 and two reference voltage tracks 276 and 278. Each of the multiple supply voltage tracks 262, 264, and 266 is configured to provide one or more supply voltages. Supply voltage track 262 is configured to provide supply voltage VDD1 280 and supply voltage VDD2 282. Supply voltage track 264 is configured to provide supply voltage VDD2 284, supply voltage VDD1 286, and supply voltage VDD3 288. Supply voltage track 266 is configured to provide supply voltage VDD3. Each of the reference voltage tracks 276 and 278 provides a reference voltage VSS, such as ground. In some embodiments, the supply voltage VDD1 is greater than the supply voltage VDD2, and the supply voltage VDD2 is greater than the supply voltage VDD3. In some embodiments, the supply voltage VDD1 is less than the supply voltage VDD2, and the supply voltage VDD2 is less than the supply voltage VDD3. In other embodiments, the supply voltages VDD1, VDD2, and VDD3 can compare to one another differently, such as the supply voltage VDD2 being greater than the supply voltage VDD1, and the supply voltage VDD1 being greater than the supply voltage VDD3, or the supply voltage VDD2 being less than the supply voltage VDD1, and the supply voltage VDD1 being less than the supply voltage VDD3. In other embodiments, the multiple supply voltage tracks 262, 264, and 266 can be configured to provide one or more other or different supply voltages than those depicted in FIG. 7.

The standard cells 268, 270, 272, and 274 are configured to be electrically connected to the supply voltage tracks 262, 264, and 266. The standard cell Cell9 268 is electrically connected to the supply voltage track 262 to receive supply voltage VDD1 280 and supply voltage VDD2 282 and to the first reference voltage track 276. The standard cell Cell10 270 is electrically connected to the supply voltage track 264 to receive supply voltage VDD2 284 and supply voltage VDD1 286 and to the first reference voltage track 276. The standard cell Cell11 272 is electrically connected to the supply voltage track 264 to receive supply voltage VDD2 284, supply voltage VDD1 286, and supply voltage VDD3 288 and to the supply voltage track 266 to receive supply voltage VDD3 and to the second reference voltage track 278. The standard cell Cell12 274 is electrically connected to the supply voltage track 266 to receive supply voltage VDD3 and to the second reference voltage track 278. In other embodiments, the standard cells 268, 270, 272, and 274 can be electrically connected to receive one or more other or different supply voltages than those depicted in FIG. 7.

In some embodiments, a standard cell, such as one of the standard cells 268, 270, and 272, includes multiple devices, such as multiple transistors, that are configured to be electrically connected to different supply voltages. By connecting different devices in a standard cell to different voltage supplies, the performance of the devices and the standard cell can be improved. For example, by connecting one or more devices in a standard cell to a higher voltage, timing delays and variations can be reduced, with a small increase in power consumption.

The standard cells 268, 270, 272, and 274 are electrically connected to different supply voltage tracks 262, 264, and 266 to receive the different supply voltages VDD1, VDD2, and VDD3 and optimize the trade-offs between timing delays/variations versus power consumption and area constraints in the semiconductor device 260.

Figure 8:
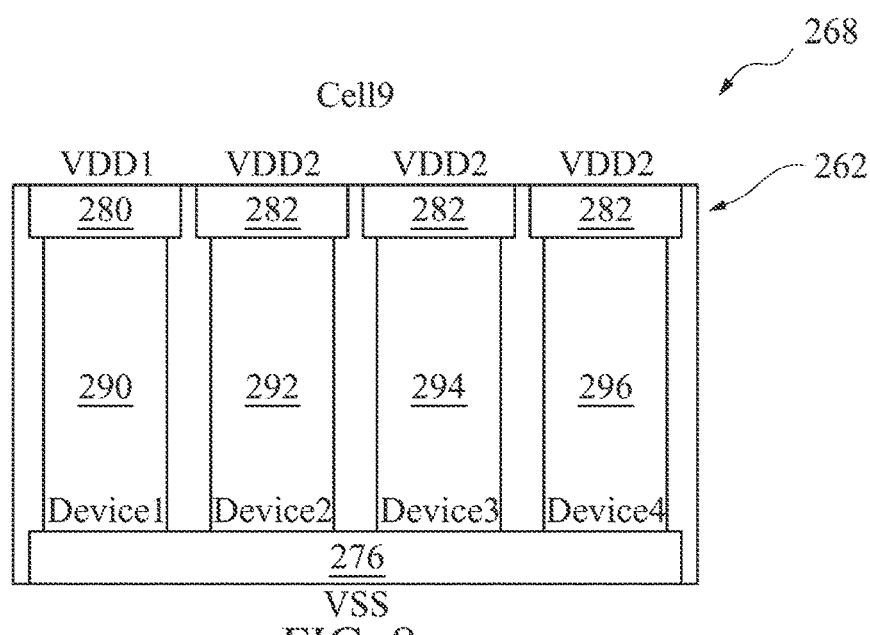
FIG. 8 is a diagram schematically illustrating a standard cell Cell9 electrically connected to a supply voltage track and a reference voltage track, in accordance with some embodiments.

FIG. 8 is a diagram schematically illustrating the standard cell Cell9 268 electrically connected to the supply voltage track 262 and the reference voltage track 276, in accordance with some embodiments. The standard cell Cell9 268 includes four devices 290, 292, 294, and 296. In some embodiments, a device, such as one of the devices 290, 292, 294, and 296 is a transistor. In some embodiments, a device, such as one of the devices 290, 292, 294, and 296 is a combination of transistors and/or other elements, such as resistors, that are configured to perform a function.

The devices 290, 292, 294, and 296 are electrically connected to the supply voltage track 262. The device Device1 290 is electrically connected to the supply voltage track 262 to receive supply voltage VDD1 280 and to the reference voltage track 276. The device Device2 292 is electrically connected to the supply voltage track 262 to receive supply voltage VDD2 282 and to the reference voltage track 276. The device Device3 294 is electrically connected to the supply voltage track 262 to receive supply voltage VDD2 282 and to the reference voltage track 276. The device Device4 296 is electrically connected to the supply voltage track 262 to receive supply voltage VDD2 282 and to the reference voltage track 276.

By electrically connecting different devices 290, 292, 294, and 296 in the standard cell 268 to different supply voltages, the performance of the devices 290, 292, 294, and 296 and the standard cell 268 can be improved and/or optimized. For example, if supply voltage VDD2 is greater than supply voltage VDD1, then by connecting the devices 292, 294, and 296 to receive supply voltage VDD2 the timing delays and variations are reduced, with a likely increase in power consumption. Thus, the trade-offs between timing delays and variations versus power consumption and area constraints can be optimized in the semiconductor device 260.

Figure 9:
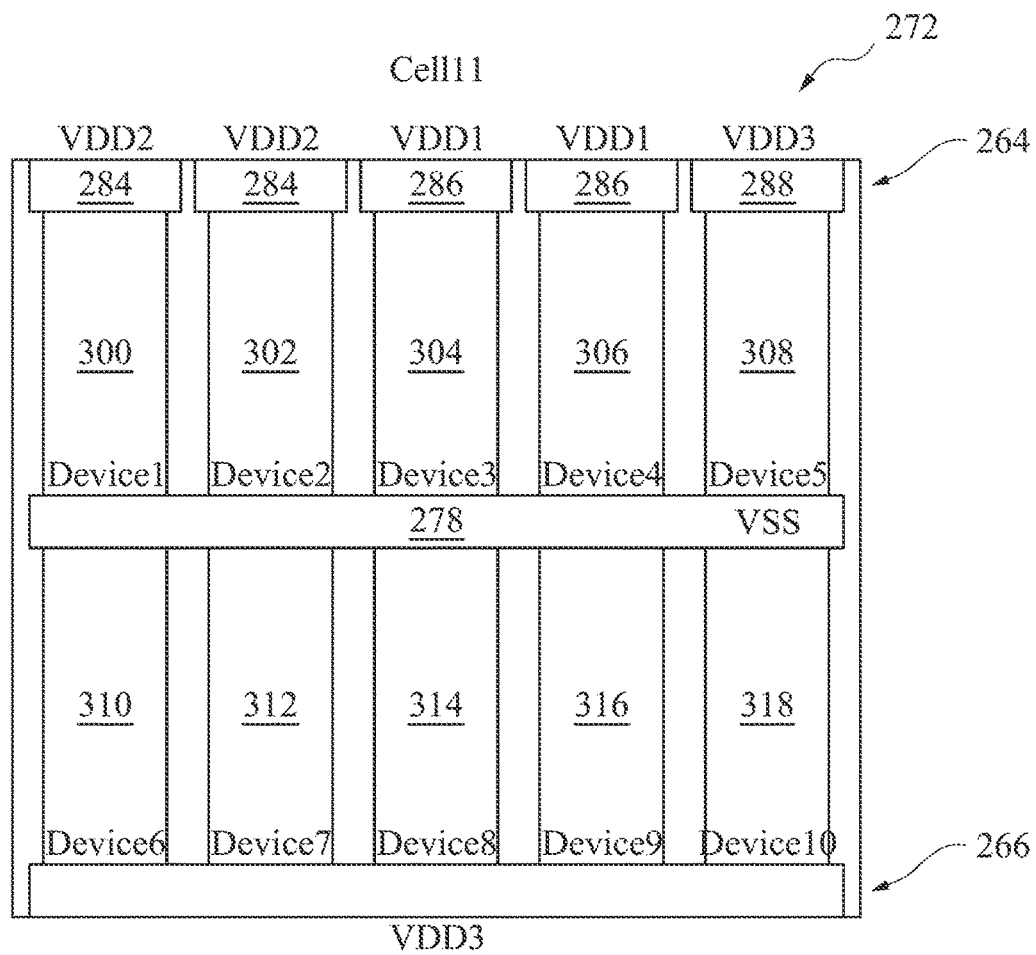
FIG. 9 is a diagram schematically illustrating a standard cell Cell11 electrically connected to supply voltage tracks and a reference voltage track, in accordance with some embodiments.

FIG. 9 is a diagram schematically illustrating the standard cell Cell11 272 electrically connected to the supply voltage tracks 264 and 266 and to the reference voltage track 278, in accordance with some embodiments. The standard cell Cell11 272 includes ten devices 300, 302, 304, 306, 308, 310, 312, 314, 316, and 318. The standard cell Cell11 272 includes five devices 300, 302, 304, 306, and 308 on one side of the reference voltage track 278 and five devices 310, 312, 314, 316, and 318 on the other side of the reference voltage track 278. In some embodiments, a device, such as one of the devices 300, 302, 304, 306, 308, 310, 312, 314, 316, and 318 is a transistor. In some embodiments, a device, such as one of the devices 300, 302, 304, 306, 308, 310, 312, 314, 316, and 318 is a combination of transistors and/or other elements, such as resistors, that are configured to perform a function.

The devices 300, 302, 304, 306, and 308 are electrically connected to the supply voltage track 264. The device Device1 300 is electrically connected to the supply voltage track 264 to receive supply voltage VDD2 284 and to the reference voltage track 278. The device Device2 302 is electrically connected to the supply voltage track 264 to receive supply voltage VDD2 284 and to the reference voltage track 278. The device Device3 304 is electrically connected to the supply voltage track 264 to receive supply voltage VDD1 286 and to the reference voltage track 278. The device Device4 306 is electrically connected to the supply voltage track 264 to receive supply voltage VDD1 286 and to the reference voltage track 278. The device Device5 308 is electrically connected to the supply voltage track 264 to receive supply voltage VDD3 288 and to the reference voltage track 278.

The devices 310, 312, 314, 316, and 318 are electrically connected to the supply voltage track 266. The device Device6 310 is electrically connected to the supply voltage track 266 to receive supply voltage VDD3 and to the reference voltage track 278. The device Device7 312 is electrically connected to the supply voltage track 266 to receive supply voltage VDD3 and to the reference voltage track 278. The device Device8 314 is electrically connected to the supply voltage track 266 to receive supply voltage VDD3 and to the reference voltage track 278. The device Device9 316 is electrically connected to the supply voltage track 266 to receive supply voltage VDD3 and to the reference voltage track 278. The device Device10 318 is electrically connected to the supply voltage track 266 to receive supply voltage VDD3 and to the reference voltage track 278.

By electrically connecting different devices 300, 302, 304, 306, 308, 310, 312, 314, 316, and 318 in the standard cell 272 to different supply voltages, the performance of the devices 300, 302, 304, 306, 308, 310, 312, 314, 316, and 318 and the standard cell 272 can be improved and/or optimized. For example, if supply voltage VDD2 is greater than supply voltage VDD1, then by connecting the devices 300 and 302 to receive supply voltage VDD2, instead of supply voltage VDD1, the timing delays and variations are reduced in the devices 300 and 302, with a likely increase in power consumption. Also, if supply voltage VDD3 is greater than supply voltage VDD2 and supply voltage VDD1, then by connecting the devices 308, 310, 312, 314, 316, and 318 to receive supply voltage VDD3, instead of supply voltage VDD2 or supply voltage VDD1, the timing delays and variations are reduced in the devices 308, 310, 312, 314, 316, and 318, with a likely increase in power consumption. In addition, if supply voltage VDD1 is less than supply voltage VDD2 and supply voltage VDD3, then by connecting the devices 304 and 306 to receive supply voltage VDD1, instead of supply voltage VDD2 or supply voltage VDD3, the power consumption is reduced in the semiconductor device 260. Thus, the trade-offs between timing delays and variations versus power consumption and area constraints can be optimized in the semiconductor device 260.

Figure 10:
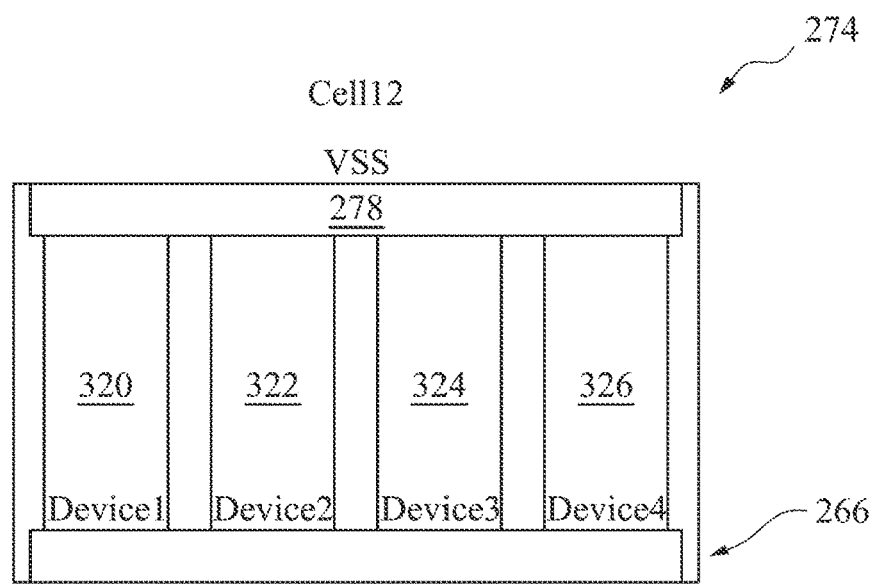
FIG. 10 is a diagram schematically illustrating a standard cell Cell12 electrically connected to a supply voltage track and a reference voltage track, in accordance with some embodiments.

FIG. 10 is a diagram schematically illustrating the standard cell Cell12 274 electrically connected to the supply voltage track 266 and to the reference voltage track 278, in accordance with some embodiments. The standard cell Cell12 274 includes four devices 320, 322, 324, and 326. In some embodiments, a device, such as one of the devices 320, 322, 324, and 326 is a transistor. In some embodiments, a device, such as one of the devices 320, 322, 324, and 326 is a combination of transistors and/or other elements, such as resistors, that are configured to perform a function.

The devices 320, 322, 324, and 326 are electrically connected to the supply voltage track 266. The device Device1 320 is electrically connected to the supply voltage track 266 to receive supply voltage VDD3 and to the reference voltage track 278. The device Device2 322 is electrically connected to the supply voltage track 266 to receive supply voltage VDD3 and to the reference voltage track 278. The device Device3 324 is electrically connected to the supply voltage track 266 to receive supply voltage VDD3 and to the reference voltage track 278. The device Device4 326 is electrically connected to the supply voltage track 266 to receive supply voltage VDD3 and to the reference voltage track 278.

By electrically connecting devices 320, 322, 324, and 326 in the standard cell 274 to supply voltages, the performance of the devices 320, 322, 324, and 326 and the standard cell 274 can be improved and/or optimized. For example, if supply voltage VDD3 is greater than supply voltage VDD2 and supply voltage VDD1, then by connecting the devices 320, 322, 324, and 326 to receive supply voltage VDD3 the timing delays and variations are reduced in the devices 320, 322, 324, and 326, with a likely increase in power consumption. Thus, the trade-offs between timing delays and variations versus power consumption and area constraints can be optimized in the semiconductor device 260.

Figure 11:
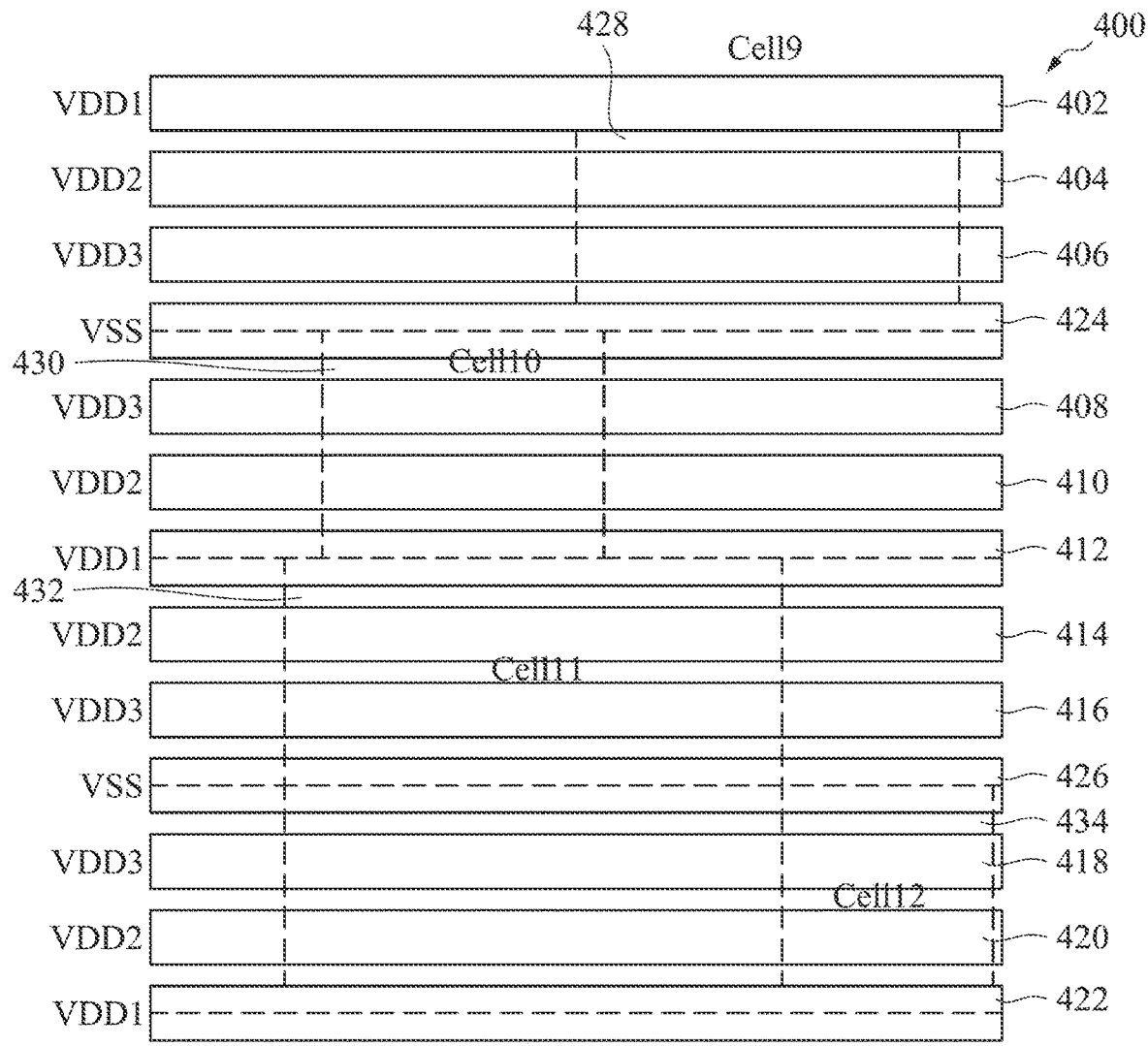
FIG. 11 is a diagram schematically illustrating a semiconductor device that includes supply voltage tracks in different rows of the semiconductor device, in accordance with some embodiments.

FIG. 11 is a diagram schematically illustrating a semiconductor device 400 that includes supply voltage tracks 402, 404, 406, 408, 410, 412, 414, 416, 418, 420, and 422 in different rows of the semiconductor device 400, in accordance with some embodiments. Each of the supply voltage tracks 402, 404, 406, 408, 410, 412, 414, 416, 418, 420, and 422 is in a different row, i.e., at a different vertical height, in the semiconductor device 400 to provide a power delivery network (PDN) of the semiconductor device 400. The semiconductor device 400 further includes two reference voltage tracks 424 and 426 and four standard cells 428, 430, 432, and 434. In some embodiments, the standard cells 428, 430, 432, and 434 perform logic functions, such as AND, OR, NOT, NAND, and NOR logic functions. In some embodiments, the semiconductor device 400 is an integrated circuit.

Each of the supply voltage tracks 402, 404, 406, 408, 410, 412, 414, 416, 418, 420, and 422 is configured to provide one supply voltage. Supply voltage tracks 402, 412, and 422 are each configured to provide supply voltage VDD1. Supply voltage tracks 404, 410, 414, and 420 are each configured to provide supply voltage VDD2. Supply voltage tracks 406, 408, 416, and 418 are each configured to provide supply voltage VDD3. Also, each of the reference voltage tracks 424 and 426 provides a reference voltage VSS, such as ground. In some embodiments, the supply voltage VDD1 is greater than the supply voltage VDD2, and the supply voltage VDD2 is greater than the supply voltage VDD3. In some embodiments, the supply voltage VDD1 is less than the supply voltage VDD2, and the supply voltage VDD2 is less than the supply voltage VDD3. In other embodiments, the supply voltages VDD1, VDD2, and VDD3 can compare to one another differently, such as the supply voltage VDD2 being greater than the supply voltage VDD1, and the supply voltage VDD1 being greater than the supply voltage VDD3, or the supply voltage VDD2 being less than the supply voltage VDD1, and the supply voltage VDD1 being less than the supply voltage VDD3. In other embodiments, the supply voltage tracks 402, 404, 406, 408, 410, 412, 414, 416, 418, 420, and 422 can be configured to provide one or more other or different supply voltages than those depicted in FIG. 11.

The standard cells 428, 430, 432, and 434 are configured to be electrically connected to the supply voltage tracks 402, 404, 406, 408, 410, 412, 414, 416, 418, 420, and 422. The standard cell Cell9 428 is electrically connected to the supply voltage track 402 to receive supply voltage VDD1, to the supply voltage track 404 to receive supply voltage VDD2, and to the reference voltage track 424. The standard cell Cell10 430 is electrically connected to the supply voltage track 410 to receive supply voltage VDD2, to the supply voltage track 412 to receive supply voltage VDD1, and to the reference voltage track 424. The standard cell Cell11 432 is electrically connected to the supply voltage track 414 to receive supply voltage VDD2, to the supply voltage track 412 to receive supply voltage VDD1, and to supply voltage track 416 to receive supply voltage VDD3. The standard cell Cell11 432 is further electrically connected to the supply voltage track 418 to receive supply voltage VDD3 and to the reference voltage track 426. The standard cell Cell12 434 is electrically connected to the supply voltage track 418 to receive supply voltage VDD3 and to the reference voltage track 426. In other embodiments, the standard cells 428, 430, 432, and 434 can be electrically connected to receive one or more other or different supply voltages.

In some embodiments, each of the standard cells 428, 430, 432, and 434 includes multiple devices, such as transistors, that are configured to be electrically connected to receive supply voltages. Each of the devices is configured to be electrically connected to one of the supply voltage tracks 402, 404, 406, 408, 410, 412, 414, 416, 418, 420, and 422 at the vertical height of the row of the selected supply voltage track. By connecting different devices in a standard cell to different supply voltages, the performance of the devices and the standard cell can be improved and/or optimized. For example, by connecting one or more devices in a standard cell to a higher voltage, timing delays and variations can be reduced with a small increase in power consumption.

The standard cells 428, 430, 432, and 434 are electrically connected to different supply voltage tracks 402, 404, 406, 408, 410, 412, 414, 416, 418, 420, and 422 to receive the different supply voltages VDD1, VDD2, and VDD3 and optimize the trade-offs between timing delays/variations versus power consumption and area constraints in the semiconductor device 400.

Figure 12:
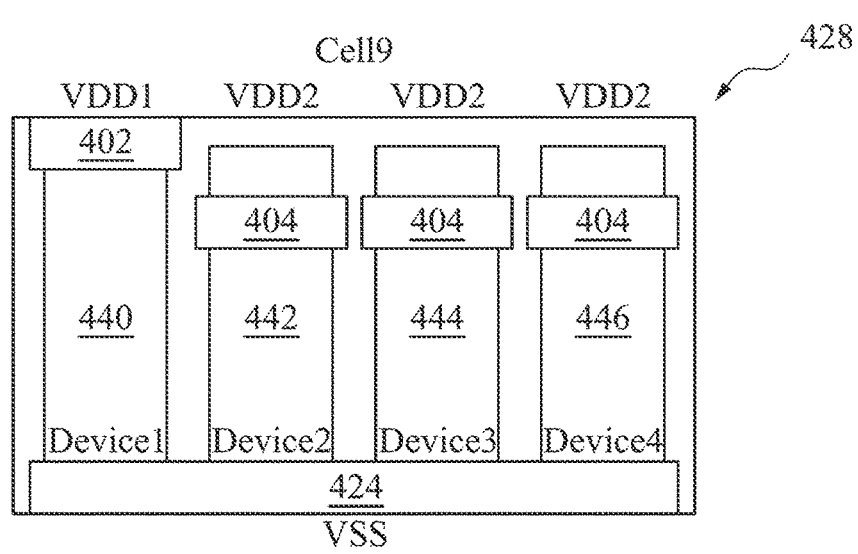
FIG. 12 is a diagram schematically illustrating a standard cell Cell9 electrically connected to multiple supply voltage tracks and a reference voltage track, in accordance with some embodiments.

FIG. 12 is a diagram schematically illustrating the standard cell Cell9 428 electrically connected to the supply voltage tracks 402 and 404 and the reference voltage track 424, in accordance with some embodiments. The standard cell Cell9 428 includes four devices 440, 442, 444, and 446. In some embodiments, a device, such as one of the devices 440, 442, 444, and 446, is a transistor. In some embodiments, a device, such as one of the devices 440, 442, 444, and 446, is a combination of transistors and/or other elements, such as resistors, that are configured to perform a function.

Each of the devices 440, 442, 444, and 446 is configured to be electrically connected to one of the supply voltage tracks 402 and 404 at the vertical height of the row of the supply voltage track 402 and 404 in the semiconductor device 400. The device 440 is electrically connected to the supply voltage track 402 and the devices 442, 444, and 446 are electrically connected to the supply voltage track 404.

The device Device1 440 is electrically connected to the supply voltage track 402 to receive supply voltage VDD1 and to the reference voltage track 424. The device Device2 442 is electrically connected to the supply voltage track 404 to receive supply voltage VDD2 and to the reference voltage track 424. The device Device3 444 is electrically connected to the supply voltage track 404 to receive supply voltage VDD2 and to the reference voltage track 424. The device Device4 446 is electrically connected to the supply voltage track 404 to receive supply voltage VDD2 and to the reference voltage track 424.

By electrically connecting different devices 440, 442, 444, and 446 in the standard cell 428 to different supply voltages, the performance of the devices 440, 442, 444, and 446 and the standard cell 428 can be improved and/or optimized. For example, if supply voltage VDD2 is greater than supply voltage VDD1, then by connecting the devices 442, 444, and 446 to receive supply voltage VDD2 the timing delays and variations are reduced, with a likely increase in power consumption. Thus, the trade-offs between timing delays and variations versus power consumption and area constraints can be optimized in the semiconductor device 400.

Figure 13:
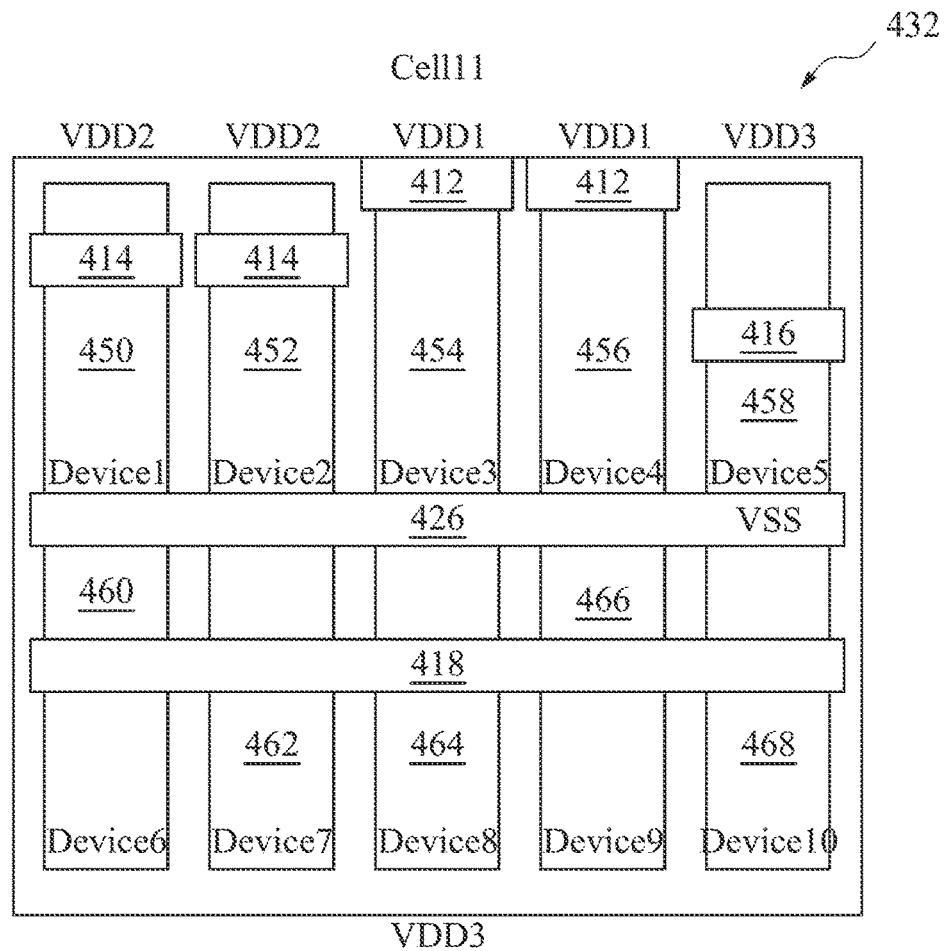
FIG. 13 is a diagram schematically illustrating a standard cell Cell11 electrically connected to multiple supply voltage tracks and a reference voltage track, in accordance with some embodiments.

FIG. 13 is a diagram schematically illustrating the standard cell Cell11 432 electrically connected to the supply voltage tracks 412, 414, 416 and 418 and the reference voltage track 426, in accordance with some embodiments. The standard cell Cell11 432 includes ten devices 450, 452, 454, 456, 458, 460, 462, 464, 466, and 468. The standard cell Cell11 432 includes five devices 450, 452, 454, 456, and 458 on one side of the reference voltage track 426 and five devices 460, 462, 464, 466, and 468 on the other side of the reference voltage track 426. In some embodiments, a device, such as one of the devices 450, 452, 454, 456, 458, 460, 462, 464, 466, and 468 is a transistor. In some embodiments, a device, such as one of the devices 450, 452, 454, 456, 458, 460, 462, 464, 466, and 468 is a combination of transistors and/or other elements, such as resistors, that are configured to perform a function.

Each of the devices 450, 452, 454, 456, 458, 460, 462, 464, 466, and 468 is configured to be electrically connected to one of the supply voltage tracks 412, 414, 416 and 418 at the vertical height of the row of the supply voltage track 412, 414, 416 and 418 in the semiconductor device 400. The devices 450 and 452 are each electrically connected to the supply voltage track 414, the devices 454 and 456 are each electrically connected to the supply voltage track 412, the device 458 is electrically connected to the supply voltage track 416, and the devices 460, 462, 464, 466, and 468 are each electrically connected to the supply voltage track 418.

The devices 450, 452, 454, 456, and 458 are electrically connected to the supply voltage tracks 412, 414, and 416. The device Device1 450 is electrically connected to the supply voltage track 414 to receive supply voltage VDD2 and to the reference voltage track 426. The device Device2 452 is electrically connected to the supply voltage track 414 to receive supply voltage VDD2 and to the reference voltage track 426. The device Device3 454 is electrically connected to the supply voltage track 412 to receive supply voltage VDD1 and to the reference voltage track 426. The device Device4 456 is electrically connected to the supply voltage track 412 to receive supply voltage VDD1 and to the reference voltage track 426. The device Device5 458 is electrically connected to the supply voltage track 416 to receive supply voltage VDD3 and to the reference voltage track 426.

The devices 460, 462, 464, 466, and 468 are electrically connected to the supply voltage track 418. The device Device6 460 is electrically connected to the supply voltage track 418 to receive supply voltage VDD3 and to the reference voltage track 426. The device Device7 462 is electrically connected to the supply voltage track 418 to receive supply voltage VDD3 and to the reference voltage track 426. The device Device8 464 is electrically connected to the supply voltage track 418 to receive supply voltage VDD3 and to the reference voltage track 426. The device Device9 466 is electrically connected to the supply voltage track 418 to receive supply voltage VDD3 and to the reference voltage track 426. The device Device10 468 is electrically connected to the supply voltage track 418 to receive supply voltage VDD3 and to the reference voltage track 426.

By electrically connecting different devices 450, 452, 454, 456, 458, 460, 462, 464, 466, and 468 in the standard cell 432 to different supply voltages, the performance of the devices 450, 452, 454, 456, 458, 460, 462, 464, 466, and 468 and the standard cell 432 can be improved and/or optimized. For example, if supply voltage VDD2 is greater than supply voltage VDD1, then by connecting the devices 450 and 452 to receive supply voltage VDD2, instead of supply voltage VDD1, the timing delays and variations are reduced in the devices 450 and 452, with a likely increase in power consumption. Also, if supply voltage VDD3 is greater than supply voltage VDD2 and supply voltage VDD1, then by connecting the devices 458, 460, 462, 464, 466, and 468 to receive supply voltage VDD3, instead of supply voltage VDD2 or supply voltage VDD1, the timing delays and variations are reduced in the devices 458, 460, 462, 464, 466, and 468, with a likely increase in power consumption. In addition, if supply voltage VDD1 is less than supply voltage VDD2 and supply voltage VDD3, then by connecting the devices 454 and 456 to receive supply voltage VDD1, instead of supply voltage VDD2 or supply voltage VDD3, the power consumption is reduced in the semiconductor device 400. Thus, the trade-offs between timing delays and variations versus power consumption and area constraints can be optimized in the semiconductor device 400.

Figure 14:
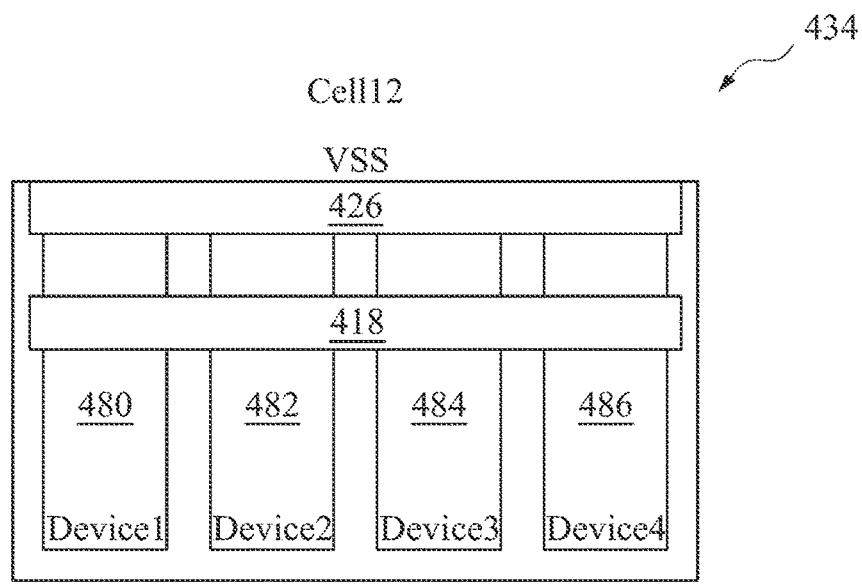
FIG. 14 is a diagram schematically illustrating a standard cell Cell12 electrically connected to a supply voltage track and a reference voltage track, in accordance with some embodiments.

FIG. 14 is a diagram schematically illustrating the standard cell Cell12 434 electrically connected to the supply voltage track 418 and the reference voltage track 426, in accordance with some embodiments. The standard cell Cell12 434 includes four devices 480, 482, 484, and 486. In some embodiments, a device, such as one of the devices 480, 482, 484, and 486 is a transistor. In some embodiments, a device, such as one of the devices 480, 482, 484, and 486 is a combination of transistors and/or other elements, such as resistors, that are configured to perform a function.

Each of the devices 480, 482, 484, and 486 is electrically connected to the supply voltage track 418 at the vertical height of the row of the supply voltage track 418 in the semiconductor device 400. The device Device1 480 is electrically connected to the supply voltage track 418 to receive supply voltage VDD3 and to the reference voltage track 426. The device Device2 482 is electrically connected to the supply voltage track 418 to receive supply voltage VDD3 and to the reference voltage track 426. The device Device3 484 is electrically connected to the supply voltage track 418 to receive supply voltage VDD3 and to the reference voltage track 426. The device Device4 486 is electrically connected to the supply voltage track 418 to receive supply voltage VDD3 and to the reference voltage track 426.

By electrically connecting devices 480, 482, 484, and 486 in the standard cell 434 to supply voltages, the performance of the devices 480, 482, 484, and 486 and the standard cell 434 can be improved and/or optimized. For example, if supply voltage VDD3 is greater than supply voltage VDD2 and supply voltage VDD1, then by connecting the devices 480, 482, 484, and 486 to receive supply voltage VDD3, instead of the supply voltage VDD2 or the supply voltage VDD1, the timing delays and variations are reduced in the devices 480, 482, 484, and 486, with a likely increase in power consumption. Thus, the trade-offs between timing delays and variations versus power consumption and area constraints can be optimized in the semiconductor device 400.

Figure 15:
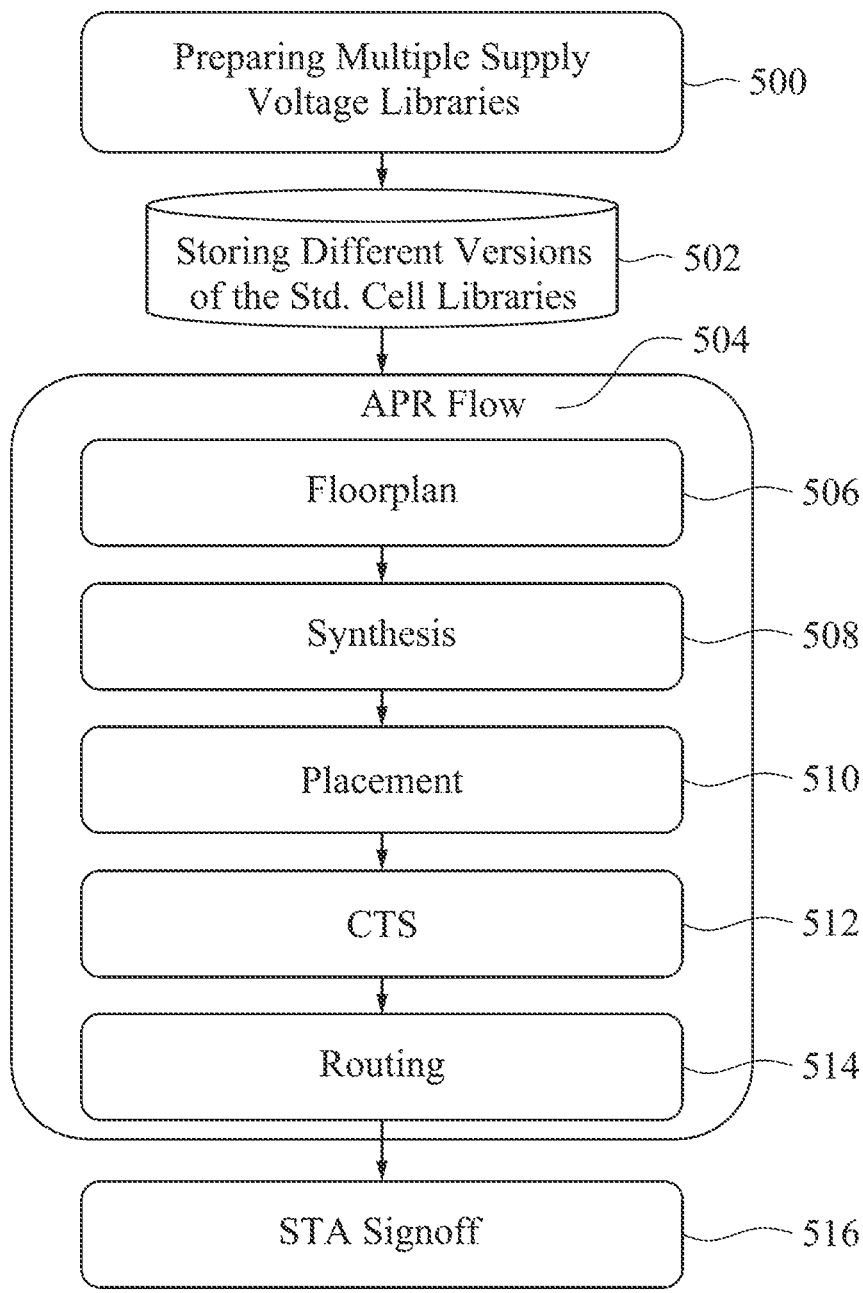
FIG. 15 is a diagram schematically illustrating a method of manufacturing a semiconductor device, in accordance with some embodiments.

FIG. 15 is a diagram schematically illustrating a method of manufacturing a semiconductor device, in accordance with some embodiments. The manufacturing of the semiconductor device includes design, layout, and fabrication of the semiconductor device such as by a computer system like the computer system 100 of FIG. 3 and the semiconductor device manufacturing system 122 of FIG. 4. The semiconductor device can be any of the semiconductor devices described in this disclosure, or another semiconductor device. In some embodiments, the semiconductor device is one of: the semiconductor device 30 of FIG. 1; the semiconductor device 60 of FIG. 2; the semiconductor device 200 of FIG. 5; the semiconductor device 230 of FIG. 6; the semiconductor device 260 of FIG. 7; and the semiconductor device 400 of FIG. 11. In some embodiments, the semiconductor device is an integrated circuit.

At step 500, the method includes preparing multiple supply voltage libraries. In this step, multiple versions of standard cell libraries are constructed, where different versions of a standard cell library are made for different supply voltages. Each of the different versions of a standard cell library is characterized for providing accurate timing delays, timing variations, and power consumption information. In some embodiments, one or more standard cell layouts are changed in different versions of a standard cell library. In some embodiments, the standard cell layouts are not changed for different versions of a standard cell library, which reduces the library preparation effort.

At step 502, the method includes storing the different versions of the standard cell libraries in a system's memory, such as the computer system 100 of FIG. 3. In some embodiments, the method includes storing the different versions of the standard cell libraries in the database 118 of the computer-readable storage medium 104 in the computer system 100 of FIG. 3.

At step 504, the method includes performing an automated place and route (APR) flow. The APR flow can be performed by a computer system, such as the computer system 100 of FIG. 1.

At step 506, the method includes generating a floorplan of the semiconductor device, which includes providing multiple supply voltage tracks in the semiconductor device. In some embodiments, generating the floorplan includes providing supply voltage tracks that provide a single supply voltage, such as the supply voltage tracks shown in FIGS. 1, 5, and 6. In some embodiments, generating the floorplan includes providing supply voltage tracks that provide one or more supply voltages per supply voltage track, such as the supply voltage tracks shown in FIGS. 2 and 7. In some embodiments, generating the floorplan includes providing supply voltage tracks at different vertical heights in rows of the semiconductor device, such as the supply voltage tracks shown in FIG. 11. In some embodiments, generating the floorplan includes providing supply voltage track tiles, where each tile has a pre-designed supply voltage track pattern.

At step 508, the method includes synthesis of the functions of the semiconductor device into standard cells from the multiple standard cell libraries. In some embodiments, synthesis creates a netlist of the standard cells that perform the functions of the semiconductor device. In some embodiments, synthesis is the process of transforming hardware design language (HDL) into a gate-level netlist, given all the specified constraints and optimization settings. In some embodiments, synthesis is the process of translating and mapping register transfer level (RTL) code written in HDL into technology specific gate-level representations.

At step 510, the method includes placement of the standard cells that perform the functions of the semiconductor device into the floorplan of the semiconductor device. The standard cells are placed in cell rows of the floorplan and electrically connected to the supply voltage tracks and supply voltages. During optimization of the timing delays, timing variations, and power consumption, the standard cells are selected from different versions of the standard cell libraries to meet the constraints of the semiconductor device.

In some embodiments, each of the cell rows in the floorplan has a supply voltage track that provides one supply voltage or set of supply voltages, such that the standard cells placed in the cell row belong to a library for the supply voltage or set of supply voltages of the cell row. During optimization, information such as timing delays, timing variations, and power consumption data are taken from this library of standard cells for the cell row. Also, during optimization, the APR tool can change the supply voltage or set of supply voltages of a cell row by splitting or merging the supply voltages of the cell row to optimize timing delays, timing variations, and power consumption and meet the constraints of the semiconductor device. This provides flexibility for the APR tool to optimize the design with different supply voltages, such as for reducing timing delay, timing variation, and/or power consumption of the semiconductor device.

At step 512, the method includes clock tree synthesis (CTS), which is the process of connecting clocks to the clock pins of sequential circuits by using inverters and/or buffers to balance clock signal skew and minimize inverter and/or buffer insertion delay. Clock balancing is very important for meeting design constraints. CTS includes both clock tree construction and clock tree balancing.

At step 514, the method includes routing conductive paths between inputs and outputs of the standard cells to provide the functions of the semiconductor device. At step 516, the method includes a static timing analysis (STA) and signoff of the layout. After signoff of the layout, the semiconductor device is fabricated, such as with the computer system 100 of FIG. 3 and the semiconductor device manufacturing system 122 of FIG. 4. In some embodiments, one or more of the steps in the APR flow 504 is repeated, with or without manual manipulation, to meet the design constraints of the semiconductor device.

Figure 16:
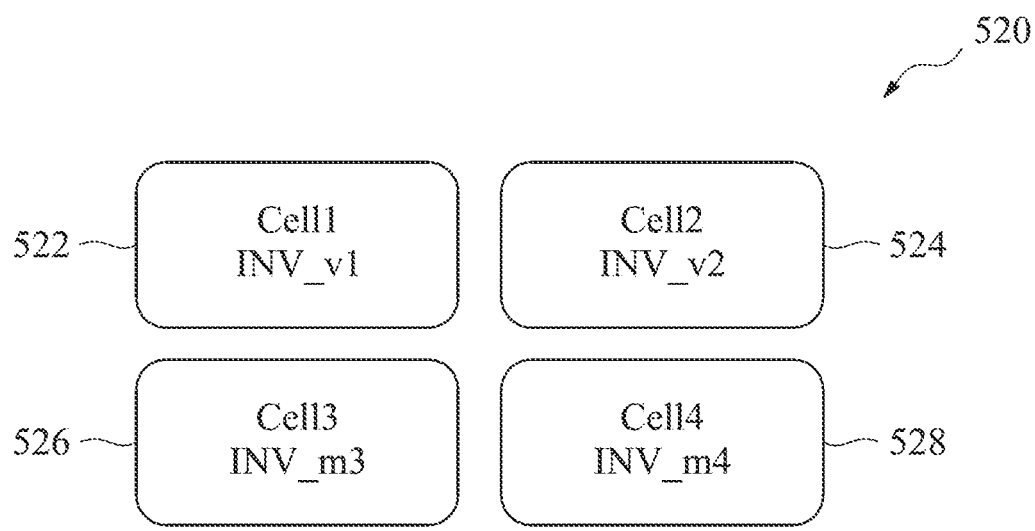
FIG. 16 is a diagram schematically illustrating an inverter (INV) standard cell group, in accordance with some embodiments.
Figure 17:
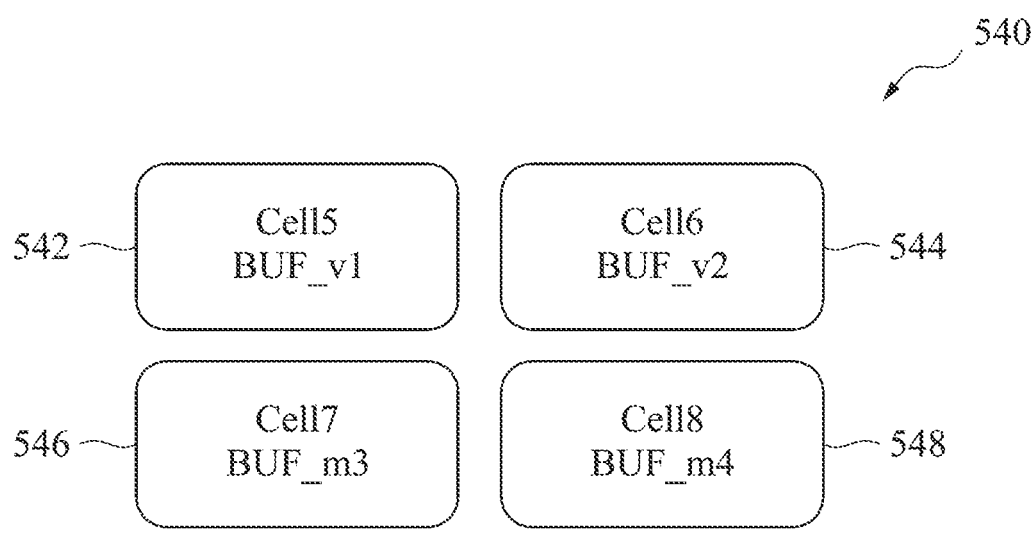
FIG. 17 is a diagram schematically illustrating a buffer (BUF) standard cell group, in accordance with some embodiments.

FIGS. 16 and 17 are diagrams schematically illustrating standard cells constructed in step 500 of the method of manufacturing a semiconductor device of FIG. 15. At step 500, the method includes preparing multiple supply voltage libraries, such as multiple versions of standard cell libraries where different versions of the standard cell libraries are made for different supply voltages. Also, in some embodiments, one or more standard cell layouts are changed in different versions of the standard cell libraries.

FIG. 16 is a diagram schematically illustrating an inverter (INV) standard cell group 520, in accordance with some embodiments. The INV standard cell group 520 includes four INV standard cells 522, 524, 526, and 528. In some embodiments, each of the INV standard cells 522, 524, 526, and 528 is from or belongs to a different standard cell library. In some embodiments, each of the INV standard cells 522, 524, 526, and 528 is from or belongs to a different version of one or more of the standard cell libraries. In some embodiments, each of the INV standard cells 522, 524, 526, and 528 is from or belongs to a different version of one or more of the standard cell libraries that is for a different supply voltage.

The INV standard cells 522, 524, 526, and 528 have names or indexes that indicate the standard cell library or version of the standard cell libraries to which they belong. The INV standard cell Cell1 522 is named INV_v1, which indicates that INV standard cell Cell1 522 is an INV standard cell that belongs to version v1 of the standard cell libraries that is configured for use with a first supply voltage or set of supply voltages. The INV standard cell Cell2 524 is named INV_v2, which indicates that INV standard cell Cell2 524 is an INV standard cell that belongs to version v2 of the standard cell libraries that is configured for use with a second supply voltage or set of supply voltages that are different than the first supply voltage or set of supply voltages. The INV standard cells 522 and 524 have the same structure but are configured for use with different supply voltages.

The INV standard cell Cell3 526 is named INV_m3, which indicates that INV standard cell Cell3 526 is an INV standard cell that belongs to version m3 of the standard cell libraries, such that the INV standard cell Cell3 526 has a different standard cell structure than other INV standard cells and is configured for use with one supply voltage or set of supply voltages. The INV standard cell Cell4 528 is named INV_m4, which indicates that INV standard cell Cell4 528 is an INV standard cell that belongs to version m4 of the standard cell libraries, such that the INV standard cell Cell4 528 has a different standard cell structure and is configured for use with another supply voltage or set of supply voltages. The INV standard cells 526 and 528 are configured for use with different supply voltages and have different standard cell structures than one another and different standard cell structures than the INV standard cells 522 and 524.

FIG. 17 is a diagram schematically illustrating a buffer (BUF) standard cell group 540, in accordance with some embodiments. The BUF standard cell group 540 includes four BUF standard cells 542, 544, 546, and 548. In some embodiments, each of the BUF standard cells 542, 544, 546, and 548 is from or belongs to a different standard cell library. In some embodiments, each of the BUF standard cells 542, 544, 546, and 548 is from or belongs to a different version of one or more of the standard cell libraries. In some embodiments, each of the BUF standard cells 542, 544, 546, and 548 is from or belongs to a different version of one or more of the standard cell libraries that is for a different supply voltage.

The BUF standard cells 542, 544, 546, and 548 have names or indexes that indicate the standard cell library or version of the standard cell libraries to which they belong. The BUF standard cell Cell5 542 is named BUF_v1, which indicates that BUF standard cell Cell5 542 is a BUF standard cell that belongs to version v1 of the standard cell libraries that is configured for use with a first supply voltage or set of supply voltages. The BUF standard cell Cell6 544 is named BUF_v2, which indicates that BUF standard cell Cell6 544 is a BUF standard cell that belongs to version v2 of the standard cell libraries that is configured for use with a second supply voltage or set of supply voltages that are different than the first supply voltage or set of supply voltages. The BUF standard cells 542 and 544 have the same standard cell structure but are configured for use with different supply voltages.

The BUF standard cell Cell7 546 is named BUF_m3, which indicates that BUF standard cell Cell7 546 is a BUF standard cell that belongs to version m3 of the standard cell libraries, such that the BUF standard cell Cell7 546 has a different standard cell structure than other BUF standard cells and is configured for use with one supply voltage or set of supply voltages. The BUF standard cell Cell8 548 is named BUF_m4, which indicates that BUF standard cell Cell8 548 is a BUF standard cell that belongs to version m4 of the standard cell libraries, such that the BUF standard cell Cell8 548 has a different standard cell structure and is configured for use with another supply voltage or set of supply voltages. The BUF standard cells 546 and 548 are configured for use with different supply voltages and have different standard cell structures than one another and different standard cell structures than the BUF standard cells 542 and 544.

FIGS. 18-23 are diagrams schematically illustrating floorplans of a semiconductor device, which are generated during step 506 of the APR flow. At step 506, the method includes generating a floorplan of the semiconductor device, which includes providing multiple supply voltage tracks in the semiconductor device. In some embodiments, the floorplan includes floorplan tiles, where each tile includes a predefined supply voltage track pattern. In some embodiments, the floorplan includes at least three different floorplan tiles including: a first floorplan tile that is a high-speed floorplan tile; a second floorplan tile that is a normal floorplan tile; and a third floorplan tile that is a low power floorplan tile. The floorplan tiles can have different dimensions, such as different height and length dimensions.

In some embodiments, different floorplans have a different composition of floorplan tiles, such as a different relative number of each of the at least three different floorplan tiles, based on the semiconductor devices PPA goals. Higher speed designs have more high-speed floorplan tiles to accommodate more standard cells at higher supply voltages, and low power designs (power intensive designs) have more low power floorplan tiles to accommodate more standard cells at lower supply voltages. In some embodiments, the PDN of the semiconductor device includes electrically connecting different floorplan tiles of the semiconductor device.

Figure 18:
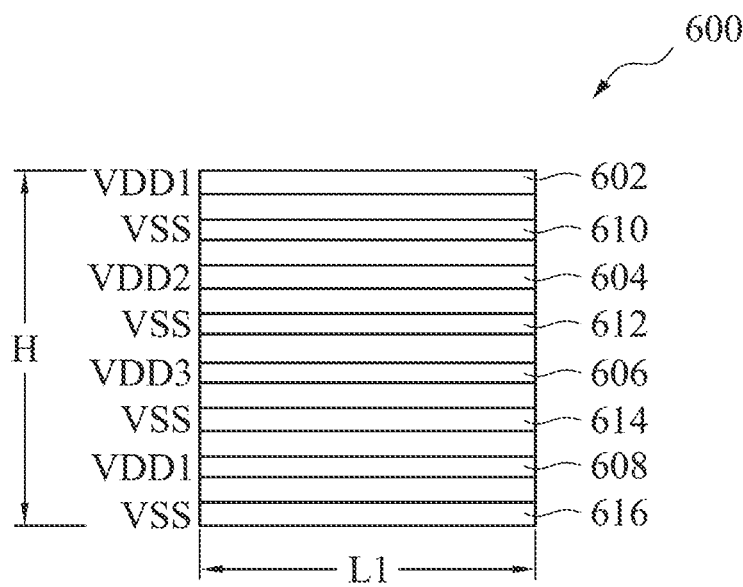
FIG. 18 is a diagram schematically illustrating a high-speed floorplan tile that is at least part of a semiconductor device, in accordance with some embodiments.

FIG. 18 is a diagram schematically illustrating a high-speed floorplan tile 600 that is at least part of a semiconductor device, in accordance with some embodiments. The high-speed floorplan tile 600 includes multiple supply voltage tracks 602, 604, 606, and 608 and multiple reference voltage tracks 610, 612, 614, and 616. Each of the reference voltage tracks 610, 612, 614, and 616 provides a reference voltage VSS, such as ground. In some embodiments, the semiconductor device is an integrated circuit.

The high-speed floorplan tile 600 includes two supply voltage tracks 602 and 608 that provide supply voltage VDD1, one supply voltage track 604 that provides supply voltage VDD2, and one supply voltage track 606 that provides supply voltage VDD3. In this example, supply voltage VDD1 is greater than supply voltage VDD2, and supply voltage VDD2 is greater than supply voltage VDD3. Thus, the high-speed floorplan tile 600 includes 50% supply voltage tracks providing the highest supply voltage VDD1, 25% supply voltage tracks providing the supply voltage VDD2, and 25% supply voltage tracks providing the lowest supply voltage VDD3. With this composition of supply voltage tracks, the high-speed floorplan tile 600 can accommodate more standard cells at higher supply voltages.

Standard cells are electrically connected to the supply voltage tracks 602, 604, 606, and 608 to receive the supply voltages VDD1, VDD2, and VDD3 and to at least one of the reference voltage tracks 610, 612, 614, and 616 to receive the reference voltage VSS.

Also, the floorplan tiles can have different dimensions, such as different height and length dimensions. The high-speed floorplan tile 600 has a height H and a length L1. In other embodiments, the high-speed floorplan tile 600, as with any other tile, can have different height and/or length dimensions.

Figure 19:
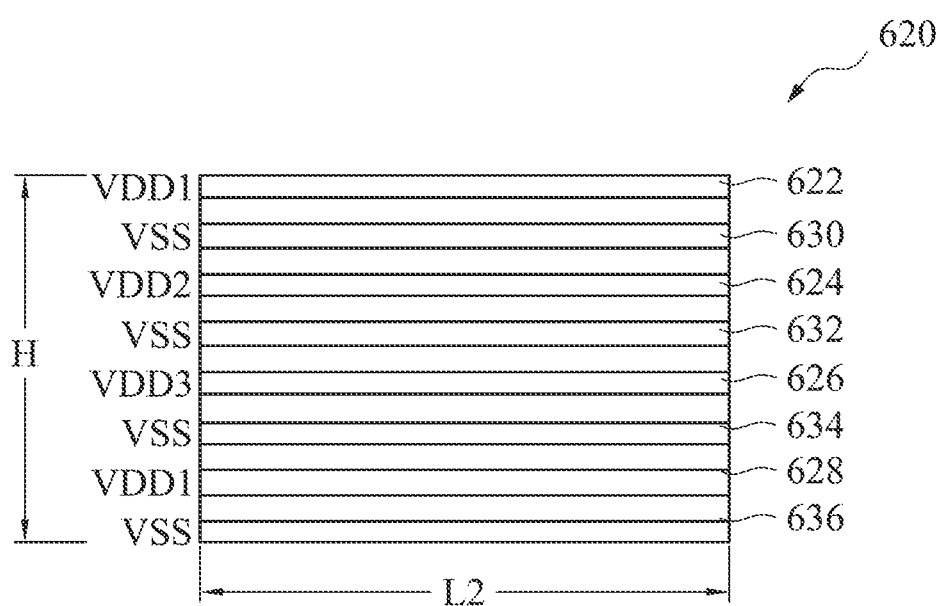
FIG. 19 is a diagram schematically illustrating a high-speed floorplan tile that has the same height H as the high-speed floorplan tile of FIG. 18, but a different length, in accordance with some embodiments.

FIG. 19 is a diagram schematically illustrating a high-speed floorplan tile 620 that has the same height H as the high-speed floorplan tile 600 of FIG. 18 but a different length, in accordance with some embodiments. The length L2 of the high-speed floorplan tile 620 is greater than the length L1 of the high-speed floorplan tile 600, such that the high-speed floorplan tile 620 can hold or accommodate more standard cells than the high-speed floorplan tile 600. The high-speed floorplan tile 620 is at least part of a semiconductor device and includes multiple supply voltage tracks 622, 624, 626, and 628 and multiple reference voltage tracks 630, 632, 634, and 636. Each of the reference voltage tracks 630, 632, 634, and 636 provides a reference voltage VSS, such as ground. In some embodiments, the semiconductor device is an integrated circuit.

The high-speed floorplan tile 620 includes two supply voltage tracks 622 and 628 that provide supply voltage VDD1, one supply voltage track 624 that provides supply voltage VDD2, and one supply voltage track 626 that provides supply voltage VDD3. In this example, supply voltage VDD1 is greater than supply voltage VDD2, and supply voltage VDD2 is greater than supply voltage VDD3. Thus, the high-speed floorplan tile 620 includes 50% supply voltage tracks providing the highest supply voltage VDD1, 25% supply voltage tracks providing the supply voltage VDD2, and 25% supply voltage tracks providing the lowest supply voltage VDD3. With this composition of supply voltage tracks, the high-speed floorplan tile 620 can accommodate more standard cells at higher supply voltages.

Standard cells are electrically connected to the supply voltage tracks 622, 624, 626, and 628 to receive the supply voltages VDD1, VDD2, and VDD3 and to at least one of the reference voltage tracks 630, 632, 634, and 636 to receive the reference voltage VSS. Also, in contrast to the high-speed floorplan tile 600 and the high-speed floorplan tile 620, a normal floorplan tile (not shown) may include 33.33 . . . % supply voltage tracks providing the highest supply voltage VDD1, 33.33 . . . % supply voltage tracks providing the supply voltage VDD2, and 33.33 . . . % supply voltage tracks providing the lowest supply voltage VDD3.

Figure 20:
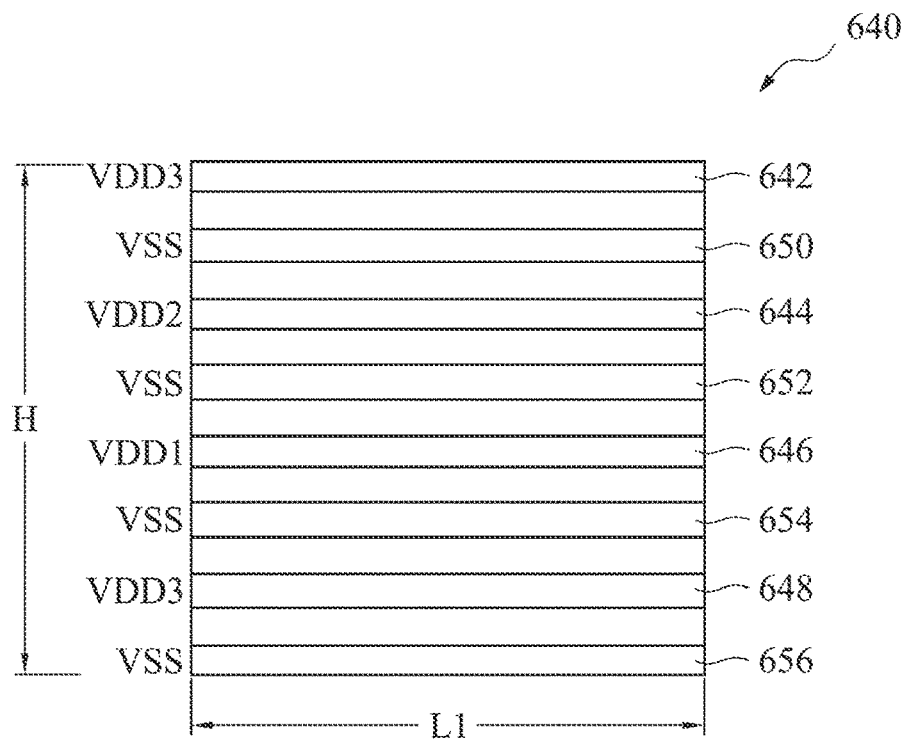
FIG. 20 is a diagram schematically illustrating a low power floorplan tile that is at least part of a semiconductor device, in accordance with some embodiments.

FIG. 20 is a diagram schematically illustrating a low power floorplan tile 640 that is at least part of a semiconductor device, in accordance with some embodiments. The low power floorplan tile 640 includes multiple supply voltage tracks 642, 644, 646, and 648 and multiple reference voltage tracks 650, 652, 654, and 656. Each of the reference voltage tracks 650, 652, 654, and 656 provides a reference voltage VSS, such as ground. In some embodiments, the semiconductor device is an integrated circuit.

The low power floorplan tile 640 includes two supply voltage tracks 642 and 648 that provide supply voltage VDD3, one supply voltage track 644 that provides supply voltage VDD2, and one supply voltage track 646 that provides supply voltage VDD1. In this example, supply voltage VDD1 is greater than supply voltage VDD2, and supply voltage VDD2 is greater than supply voltage VDD3. Thus, the low power floorplan tile 640 includes 50% supply voltage tracks providing the lowest supply voltage VDD3, 25% supply voltage tracks providing the supply voltage VDD2, and 25% supply voltage tracks providing the highest supply voltage VDD1. With this composition of supply voltage tracks, the low power floorplan tile 640 can accommodate more standard cells at lower supply voltages.

Standard cells are electrically connected to the supply voltage tracks 642, 644, 646, and 648 to receive the supply voltages VDD1, VDD2, and VDD3 and to at least one of the reference voltage tracks 650, 652, 654, and 656 to receive the reference voltage VSS.

Also, the floorplan tiles can have different dimensions, such as different height and length dimensions. The low power floorplan tile 640 has a height H and a length L1 like the high-speed floorplan tile 600. In other embodiments, the low power floorplan tile 640, as with any other tile, can have different height and/or length dimensions.

Figure 21:
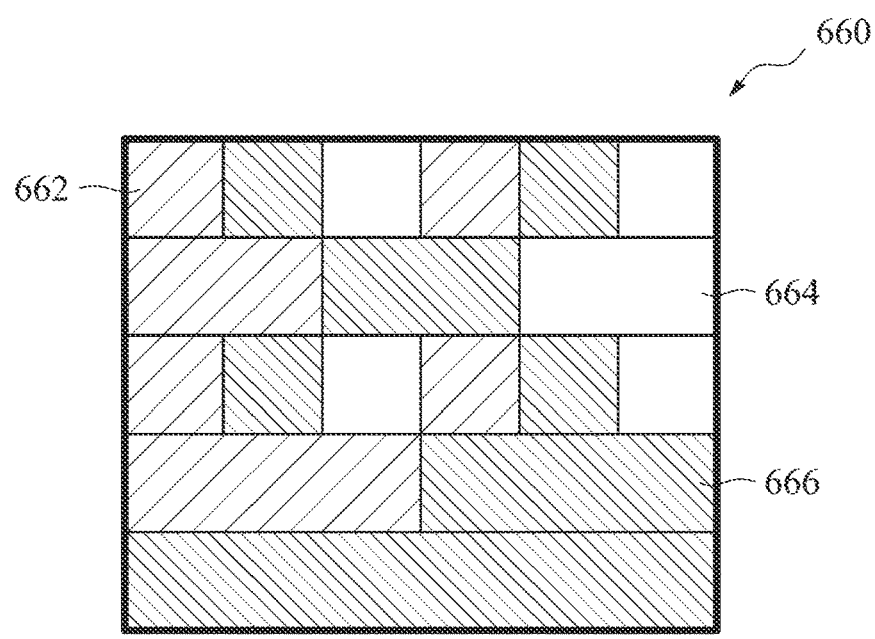
FIG. 21 is a diagram schematically illustrating a semiconductor device that includes high-speed floorplan tiles, normal floorplan tiles, and low power floorplan tiles, in accordance with some embodiments.

FIG. 21 is a diagram schematically illustrating a semiconductor device 660 that includes high-speed floorplan tiles 662, normal floorplan tiles 664, and low power floorplan tiles 666, in accordance with some embodiments. Semiconductor devices, such as the semiconductor device 660, can have different compositions, i.e., a different number and/or size of each of the floorplan tiles 662, 664, and 666, based on the semiconductor device's PPA. In some embodiments, a semiconductor device includes more high-speed floorplan tile area, such that the semiconductor device is configured to accommodate more standard cells at higher supply voltages. In some embodiments, the semiconductor device includes more low power floorplan tile area, such that the semiconductor device is configured to accommodate more standard cells at lower supply voltages.

The semiconductor device 660 includes six high-speed floorplan tiles 662 of different shapes and sizes, 5 normal tiles 664 of different shapes and sizes, and 7 low power floorplan tiles 666 of different shapes and sizes. The semiconductor device 600 includes more low power floorplan tile area than high-speed floorplan tile area, and more high-speed floorplan tile area than normal tile area. Thus, the semiconductor device 600 can accommodate more standard cells at lower supply voltages than standard cells at higher supply voltages.

Figure 22:
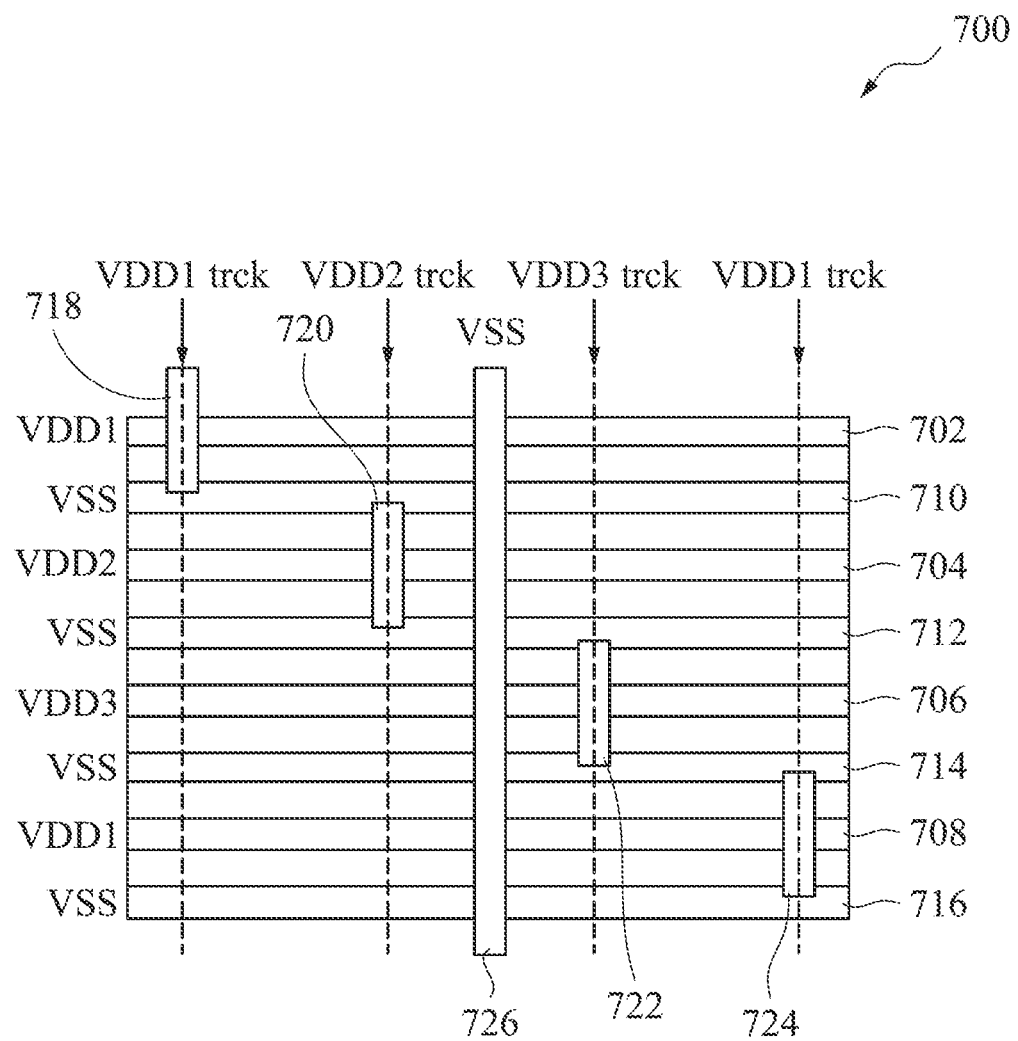
FIG. 22 is a diagram schematically illustrating a high-speed floorplan tile that includes a power delivery network (PDN) that includes supply voltage tracks configured to be electrically connected to other tiles, in accordance with some embodiments.

FIG. 22 is a diagram schematically illustrating a high-speed floorplan tile 700 that includes a PDN that includes supply voltage tracks configured to be electrically connected to other tiles, in accordance with some embodiments. The high-speed floorplan tile 700 includes horizontal supply voltage tracks 702, 704, 706, and 708, horizontal reference voltage tracks 710, 712, 714, and 716, vertical supply voltage tracks 718, 720, 722, and 724, and a vertical reference voltage track 726. Each of the reference voltage tracks 710, 712, 714, 716, and 726 provides a reference voltage VSS, such as ground. The high-speed floorplan tile 700 is part of a semiconductor device. In some embodiments, the semiconductor device is an integrated circuit.

The PDN of the high-speed floorplan tile 700 can be connected among or to different tiles, including different high-speed floorplan tiles, normal tiles, and low power floorplan tiles. The horizontal supply voltage tracks 702, 704, 706, and 708 and the horizontal reference voltage tracks 710, 712, 714, and 716 are on lower conductive layers of the semiconductor device and staggered for minimizing the utilized resources, such as row and layer resources. The vertical supply voltage tracks 718, 720, 722, and 724 and the vertical reference voltage track 726 are on upper conductive layers of the semiconductor device and staggered for minimizing the utilized resources, such as the row and layer resources. In some embodiments, the vertical supply voltage tracks 718, 720, 722, and 724 are on a common layer of the semiconductor device for connecting supply voltages from lower layers to other tiles. In some embodiments, the vertical supply voltage tracks 718, 720, 722, and 724 and the vertical reference voltage track 726 are on a common layer of the semiconductor device for connecting power supply voltages and references from lower layers to other tiles.

The high-speed floorplan tile 700 includes two supply voltage tracks 702 and 708 that provide supply voltage VDD1, one supply voltage track 704 that provides supply voltage VDD2, and one supply voltage track 706 that provides supply voltage VDD3. In this example, supply voltage VDD1 is greater than supply voltage VDD2, and supply voltage VDD2 is greater than supply voltage VDD3. Thus, the high-speed floorplan tile 700 includes 50% supply voltage tracks providing the highest supply voltage VDD1, 25% supply voltage tracks providing the supply voltage VDD2, and 25% supply voltage tracks providing the lowest supply voltage VDD3. With this composition of supply voltage tracks, the high-speed floorplan tile 700 can accommodate more standard cells at higher supply voltages.

Each of the vertical supply voltage tracks 718, 720, 722, and 724 is electrically connected to one of the horizontal supply voltage tracks 702, 704, 706, and 708. The vertical supply voltage track 718 is electrically connected to the horizontal supply voltage track 702, the vertical supply voltage track 720 is electrically connected to the horizontal supply voltage track 704, the vertical supply voltage track 722 is electrically connected to the horizontal supply voltage track 706, and the vertical supply voltage track 724 is electrically connected to the horizontal supply voltage track 708. Also, the vertical reference voltage track 726 is electrically connected to each of the horizontal reference voltage tracks 710, 712, 714, and 716. The vertical supply voltage tracks 718, 720, 722, and 724 and the vertical reference voltage track 726 can be electrically connected among or to different tiles, including different high-speed floorplan tiles, normal tiles, and low power floorplan tiles.

Standard cells are electrically connected to the supply voltage tracks 702, 704, 706, and 708 to receive the supply voltages VDD1, VDD2, and VDD3 and to at least one of the reference voltage tracks 710, 712, 714, and 716 to receive the reference voltage VSS.

Figure 23:
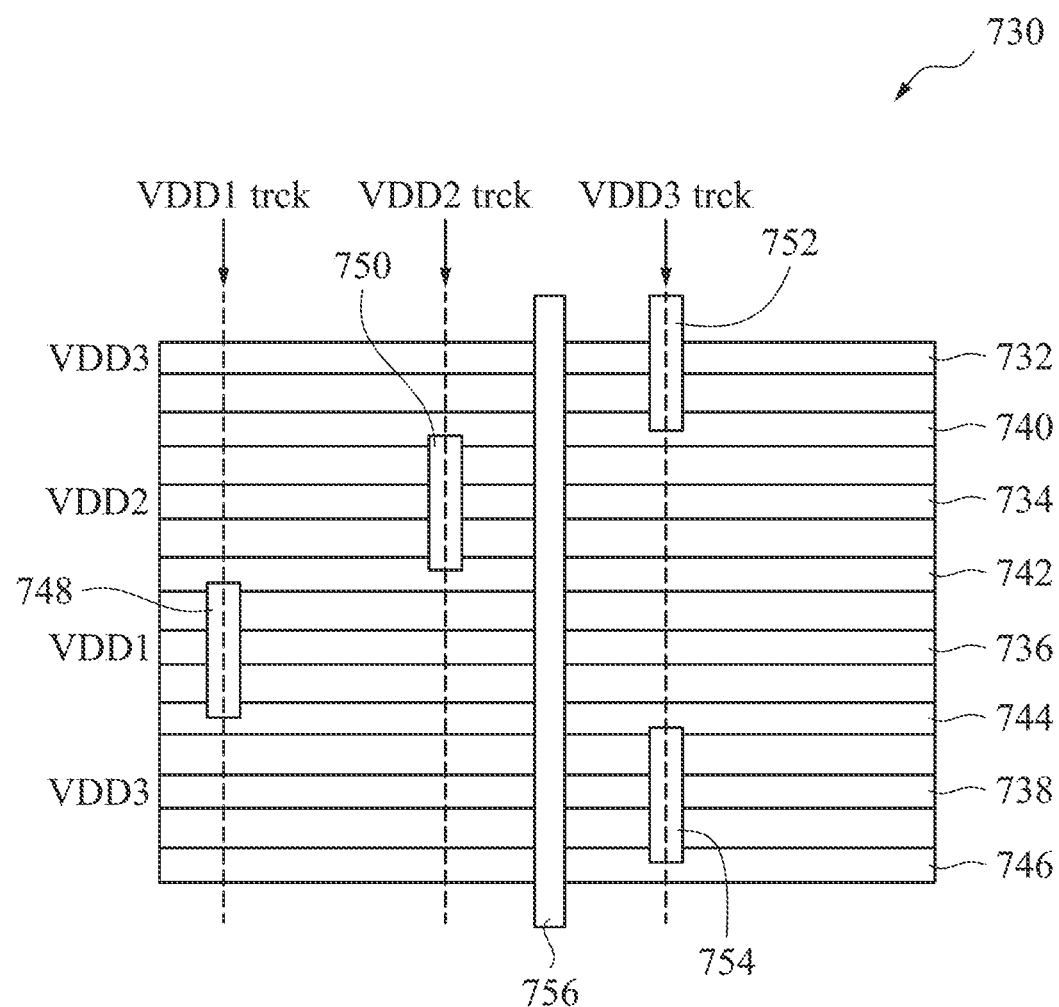
FIG. 23 is a diagram schematically illustrating a low power floorplan tile that includes a PDN that includes supply voltage tracks configured to be electrically connected to other tiles, in accordance with some embodiments.

FIG. 23 is a diagram schematically illustrating a low power floorplan tile 730 that includes a PDN that includes supply voltage tracks configured to be electrically connected to other tiles, in accordance with some embodiments. The low power floorplan tile 730 includes horizontal supply voltage tracks 732, 734, 736, and 738, horizontal reference voltage tracks 740, 742, 744, and 746, vertical supply voltage tracks 748, 750, 752, and 754, and a vertical reference voltage track 756. Each of the reference voltage tracks 740, 742, 744, 746, and 756 provides a reference voltage VSS, such as ground. The low power floorplan tile 730 is part of a semiconductor device. In some embodiments, the semiconductor device is an integrated circuit.

The PDN of the low power floorplan tile 730 can be connected among or to different tiles, including different high-speed floorplan tiles, normal tiles, and low power floorplan tiles. The horizontal supply voltage tracks 732, 734, 736, and 738 and the horizontal reference voltage tracks 740, 742, 744, and 746 are on lower conductive layers of the semiconductor device and staggered for minimizing the utilized resources, such as row and layer resources. The vertical supply voltage tracks 748, 750, 752, and 754 and the vertical reference voltage track 756 are on upper conductive layers of the semiconductor device and staggered for minimizing the utilized resources, such as the row and layer resources. In some embodiments, the vertical supply voltage tracks 748, 750, 752, and 754 are on a common layer of the semiconductor device for connecting supply voltages from lower layers to other tiles. In some embodiments, the vertical supply voltage tracks 748, 750, 752, and 754 and the vertical reference voltage track 756 are on a common layer of the semiconductor device for connecting power supply voltages and references from lower layers to other tiles.

The low power floorplan tile 730 includes two supply voltage tracks 732 and 738 that provide supply voltage VDD3, one supply voltage track 734 that provides supply voltage VDD2, and one supply voltage track 736 that provides supply voltage VDD1. In this example, supply voltage VDD1 is greater than supply voltage VDD2, and supply voltage VDD2 is greater than supply voltage VDD3. Thus, the low power floorplan tile 730 includes 50% supply voltage tracks providing the lowest supply voltage VDD3, 25% supply voltage tracks providing the supply voltage VDD2, and 25% supply voltage tracks providing the highest supply voltage VDD1. With this composition of supply voltage tracks, the low power floorplan tile 730 can accommodate more standard cells at lower supply voltages.

Each of the vertical supply voltage tracks 748, 750, 752, and 754 is electrically connected to at least one of the horizontal supply voltage tracks 732, 734, 736, and 738. The vertical supply voltage track 748 is electrically connected to the horizontal supply voltage track 736, the vertical supply voltage track 750 is electrically connected to the horizontal supply voltage track 734, the vertical supply voltage track 752 is electrically connected to the horizontal supply voltage track 732, and the vertical supply voltage track 754 is electrically connected to the horizontal supply voltage track 738. Also, the vertical reference voltage track 756 is electrically connected to each of the horizontal reference voltage tracks 740, 742, 744, and 746. The vertical supply voltage tracks 748, 750, 752, and 754 and the vertical reference voltage track 746 can be electrically connected among or to different tiles, including different high-speed floorplan tiles, normal tiles, and low power floorplan tiles. In some embodiments, the vertical supply voltage tracks 752 and 754 are electrically connected.

Standard cells are electrically connected to the supply voltage tracks 732, 734, 736, and 738 to receive the supply voltages VDD1, VDD2, and VDD3 and to at least one of the reference voltage tracks 740, 742, 744, and 746 to receive the reference voltage VSS. Also, as with the high-speed floorplan tile 700 of FIG. 22 and the low power floorplan tile 730 of FIG. 23, normal tiles can include vertical supply voltage tracks configured to be electrically connected to other tiles.

Figure 24:
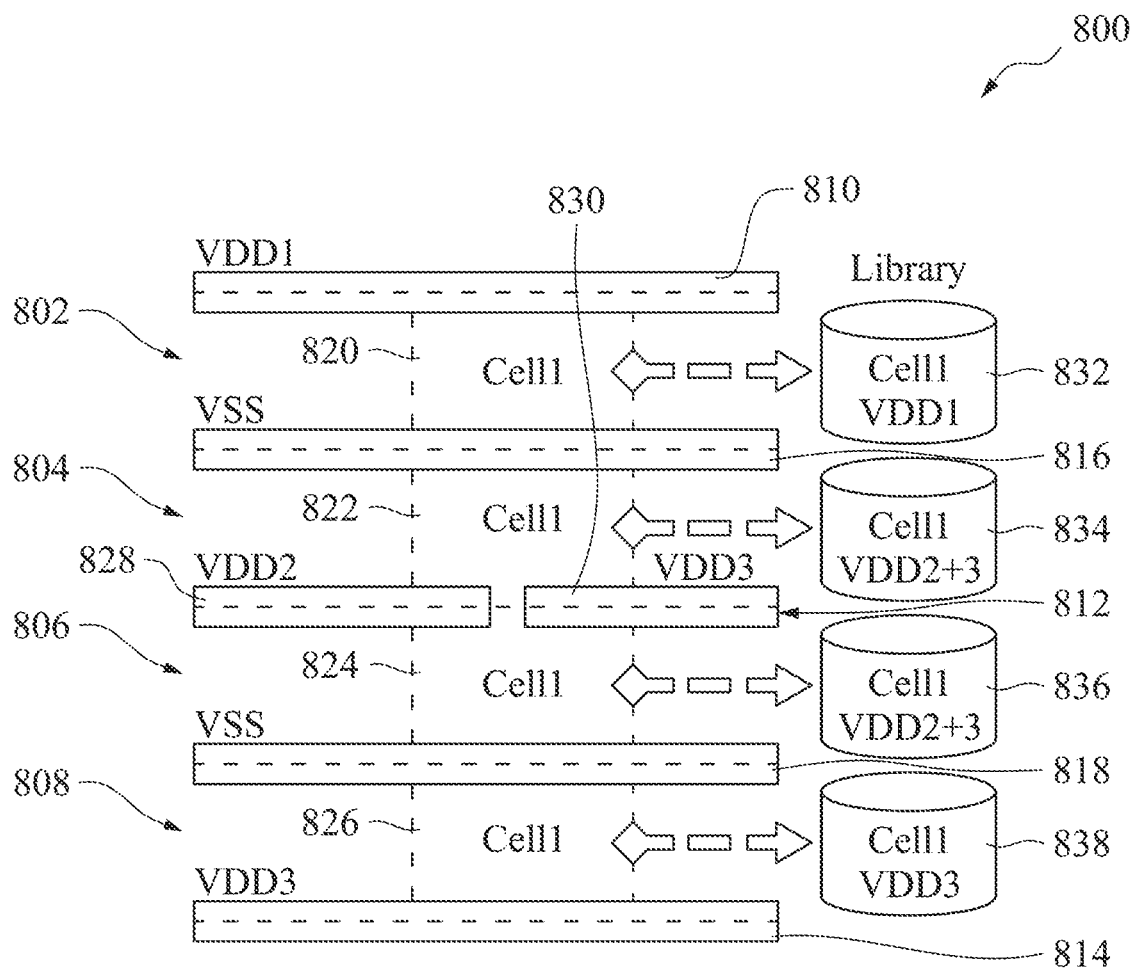
FIG. 24 is a diagram schematically illustrating a semiconductor device that includes placement of a standard cell Cell1 in each of four cell rows, in accordance with some embodiments.
Figure 25:
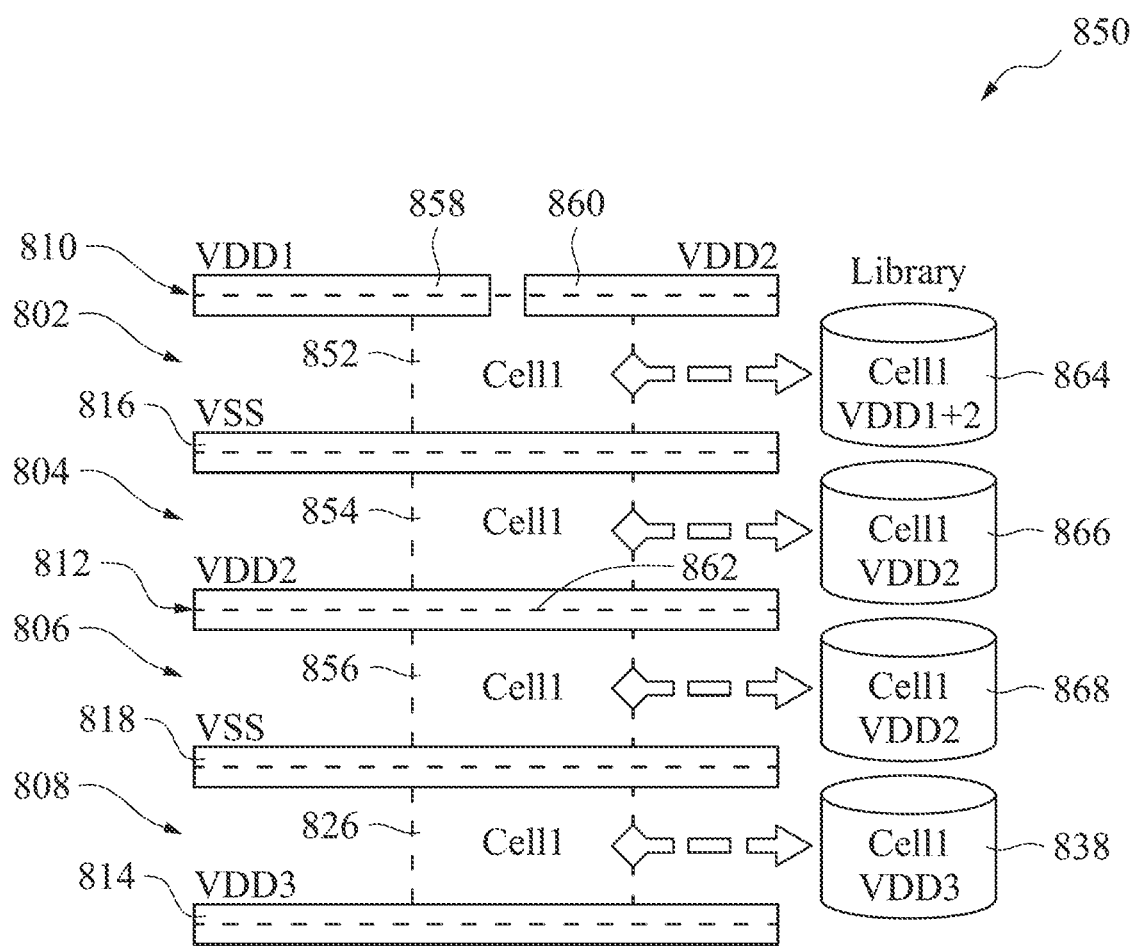
FIG. 25 is a diagram schematically illustrating a semiconductor device that is the result of optimizing the semiconductor device for timing delays, timing variations, and power consumption to meet design constraints for the semiconductor device, in accordance with some embodiments.

FIGS. 24 and 25 are diagrams schematically illustrating placement of standard cells into a floorplan, which is performed during step 510 of the APR flow. At step 510, the method includes placement of the standard cells that perform the functions of the semiconductor device into a floorplan of the semiconductor device. The standard cells are placed in cell rows of the floorplan and, eventually, electrically connected to the supply voltage tracks and supply voltages for the cell tow. Each of the cell rows in the floorplan has a supply voltage track that provides one supply voltage or set of supply voltages, such that the standard cells placed in the cell row belong to a library for the supply voltage or set of supply voltages of that cell row. During optimization, information such as timing delays, timing variations, and power consumption are taken from the library of standard cells for the supply voltage or set of supply voltages of the cell row. Also, during optimization, the APR tool can change the supply voltage or set of supply voltages of a cell row by splitting or merging the supply voltages of the cell row to optimize timing delays, timing variations, and power consumption and meet the constraints of the semiconductor device. This provides flexibility for the APR tool to optimize the design with different supply voltages, such as for reducing timing delay, timing variation, and/or power consumption of the semiconductor device.

FIG. 24 is a diagram schematically illustrating a semiconductor device 800 that includes placement of a standard cell Cell1 in each of four cell rows 802, 804, 806, and 808, in accordance with some embodiments. The standard cell Cell1 that is placed in a cell row belongs to a standard cell library for the supply voltage or set of supply voltages in that cell row. The semiconductor device 800 includes three supply voltage tracks 810, 812, and 814 and two reference voltage tracks 816 and 818. Also, the semiconductor device 800 includes four standard cells 820, 822, 824, and 826 that perform the same logic function, such as an AND, OR, NOT, NAND, or NOR logic function. In some embodiments, the semiconductor device 800 is an integrated circuit.

Each of the cell rows 802, 804, 806, and 808 includes one of the supply voltage tracks 810, 812, and 814 that is configured to provide one or more supply voltages. Cell row 802 includes supply voltage track 810 that is configured to provide supply voltage VDD1. Cell rows 804 and 806 include supply voltage track 812 that is configured to provide supply voltage VDD2 828 and supply voltage VDD3 830. Cell row 808 includes supply voltage track 814 that is configured to provide supply voltage VDD3. Also, each of the reference voltage tracks 816 and 818 provides a reference voltage VSS, such as ground. In some embodiments, the supply voltage VDD1 is greater than the supply voltage VDD2, and the supply voltage VDD2 is greater than the supply voltage VDD3. In some embodiments, the supply voltage VDD1 is less than the supply voltage VDD2, and the supply voltage VDD2 is less than the supply voltage VDD3. In other embodiments, the supply voltages VDD1, VDD2, and VDD3 can compare to one another differently, such as the supply voltage VDD2 being greater than the supply voltage VDD1, and the supply voltage VDD1 being greater than the supply voltage VDD3, or the supply voltage VDD2 being less than the supply voltage VDD1, and the supply voltage VDD1 being less than the supply voltage VDD3. In other embodiments, each of the supply voltage tracks 810, 812, and 814 is configured to provide one or more other or different supply voltages than those depicted in FIG. 24.

Each of the standard cells 820, 822, 824, and 826 is placed in one of the cell rows 802, 804, 806, and 808, respectively, and configured to be electrically connected to the supply voltage track 810, 812, or 814 that is included in the cell row 802, 804, 806, or 808. Also, the standard cells 820, 822, 824, and 826 belong to standard cell libraries 832, 834, 836, and 838, respectively, that are for the supply voltage or set of supply voltages of the supply voltage track 810, 812, or 814 that is included in the cell row 802, 804, 806, or 808.

The standard cell Cell1 820 is placed in cell row 802 and configured to be electrically connected to the supply voltage track 810 to receive supply voltage VDD1. The standard cell Cell1 820 belongs to standard cell library 832 that is for supply voltage VDD1. The standard cell Cell1 822 is placed in cell row 804 and configured to be electrically connected to the supply voltage track 812 to receive supply voltages VDD2 and VDD3. The standard cell Cell1 822 belongs to standard cell library 834 that is for supply voltages VDD2 and VDD3. The standard cell Cell1 824 is placed in cell row 806 and configured to be electrically connected to the supply voltage track 812 to receive supply voltages VDD2 and VDD3. The standard cell Cell1 824 belongs to standard cell library 836 that is for supply voltages VDD2 and VDD3. The standard cell Cell1 826 is placed in cell row 808 and configured to be electrically connected to the supply voltage track 814 to receive supply voltage VDD3. The standard cell Cell1 826 belongs to standard cell library 838 that is for supply voltage VDD3. In some embodiments, standard cell library 834 is the same as standard cell library 836. In other embodiments, each of the standard cells 820, 822, 824, and 826 is electrically connected to receive one or more other or different supply voltages than those depicted in FIG. 24.

FIG. 25 is a diagram schematically illustrating a semiconductor device 850 that is the result of optimizing the semiconductor device 800 for timing delays, timing variations, and power consumption to meet design constraints for the semiconductor device, in accordance with some embodiments. The semiconductor device 850 includes the four cell rows 802, 804, 806, and 808, the three supply voltage tracks 810, 812, and 814, and the two reference voltage tracks 816 and 818. Also, the standard cells in the semiconductor device 850 perform the same logic function, such as an AND, OR, NOT, NAND, or NOR logic function and, in some embodiments, the semiconductor device 850 is an integrated circuit.

The optimization was performed by an APR tool that is part of a computer system, such as the computer system 100 of FIG. 3. During optimization, the APR tool changed each of the supply voltage tracks 810 and 812 and placed different standard cells 852, 854, and 856 in the cell rows 802, 804, and 806, respectively, to correspond with the changes in the supply voltage tracks 810 and 812. The APR tool split supply voltage track 810 to provide supply voltages VDD1 858 and VDD2 860. Also, the APR tool merged or changed supply voltage track 812 to provide only supply voltage VDD2 862. The supply voltage track 814 was not changed.

In the semiconductor device 850, standard cell Cell1 852 is placed in cell row 802 and configured to be electrically connected to the supply voltage track 810 to receive supply voltages VDD1 858 and VDD2 860. The standard cell Cell1 852 belongs to standard cell library 864 that is for supply voltages VDD1 and VDD2. The standard cell Cell1 854 is placed in cell row 804 and configured to be electrically connected to the supply voltage track 812 to receive supply voltage VDD2 862. The standard cell Cell1 854 belongs to standard cell library 866 that is for supply voltage VDD2. The standard cell Cell1 856 is placed in cell row 806 and configured to be electrically connected to the supply voltage track 812 to receive supply voltage VDD2 862. The standard cell Cell1 856 belongs to standard cell library 868 that is for supply voltage VDD2 862. The standard cell Cell1 826 remains placed in cell row 808 and configured to be electrically connected to the supply voltage track 814 to receive supply voltage VDD3, and the standard cell Cell1 826 belongs to standard cell library 838 that is for supply voltage VDD3. In some embodiments, standard cell library 866 is the same as standard cell library 868.

Thus, during optimization, information such as timing delays, timing variations, and power consumption are taken from the standard cell libraries and the APR tool changes supply voltages for the cell rows to meet the constraints of the semiconductor device. This provides flexibility for the APR tool to optimize the design with different supply voltages and standard cells, such as for reducing timing delay, timing variation, and/or power consumption of the semiconductor device.

Figure 26:
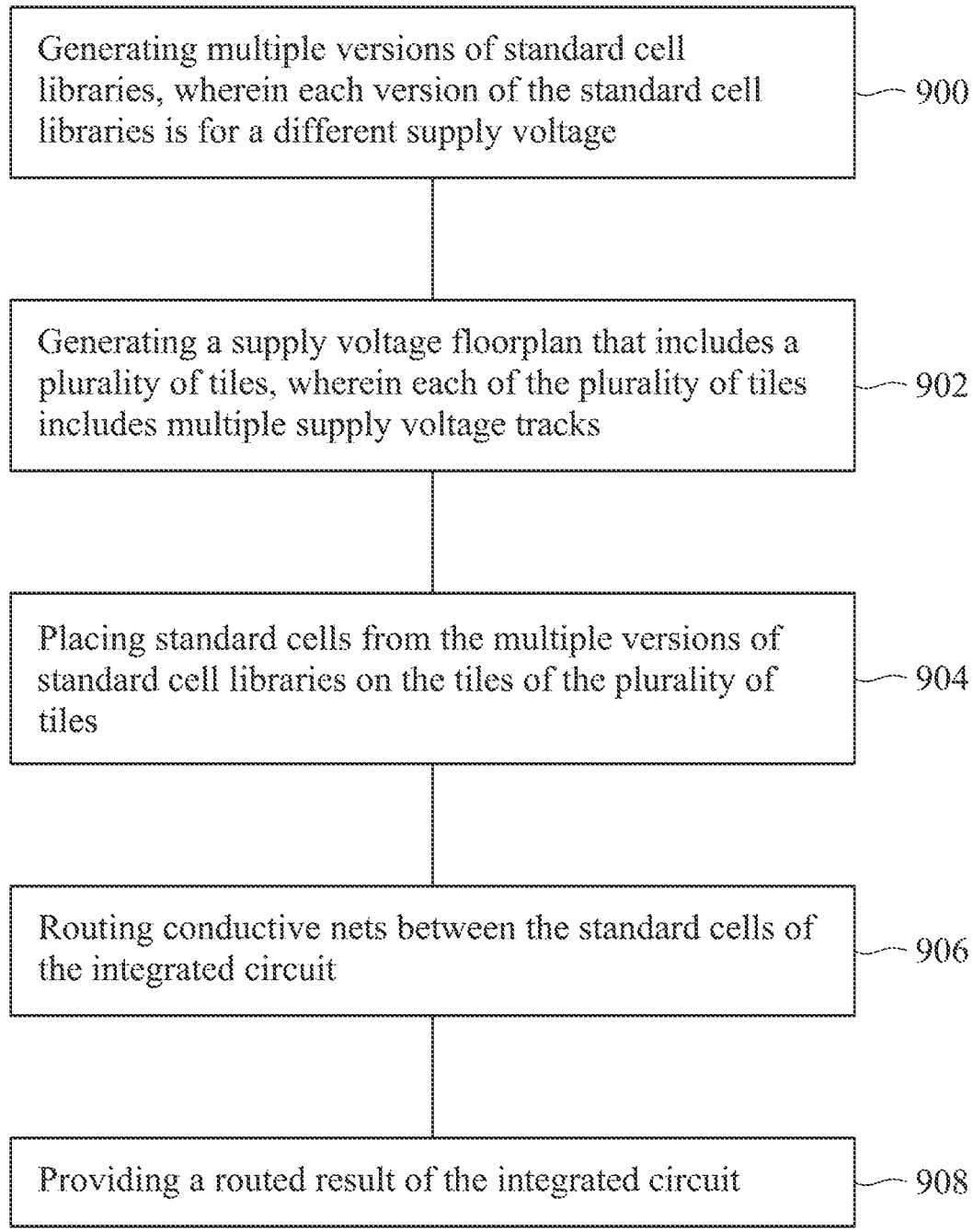
FIG. 26 is a diagram schematically illustrating a method of manufacturing a semiconductor device, in accordance with some embodiments.

FIG. 26 is a diagram schematically illustrating a method of manufacturing a semiconductor device, in accordance with some embodiments. The manufacturing of the semiconductor device includes design, layout, and fabrication of the semiconductor device such as by a computer system like the computer system 100 of FIG. 3 and the semiconductor device manufacturing system 122 of FIG. 4. The semiconductor device can be any of the semiconductor devices described in this disclosure, or another semiconductor device. In some embodiments, the semiconductor device is one of: the semiconductor device 30 of FIG. 1; the semiconductor device 60 of FIG. 2; the semiconductor device 200 of FIG. 5; the semiconductor device 230 of FIG. 6; the semiconductor device 260 of FIG. 7; and the semiconductor device 400 of FIG. 11. In some embodiments, the semiconductor device is an integrated circuit.

At step 900, the method includes generating multiple versions of standard cell libraries, wherein each version of the standard cell libraries is for a different supply voltage or set of supply voltages. In some embodiments, generating multiple versions of standard cell libraries includes generating versions of a standard cell, where each version of the standard cell has an index that identifies one of the multiple versions of standard cell libraries to which it belongs. In some embodiments, generating multiple versions of standard cell libraries includes generating versions of a standard cell that perform the same function at different voltages and with different layouts and/or structures.

At step 902, the method includes generating a supply voltage floorplan that includes a plurality of tiles, wherein each of the plurality of tiles includes multiple supply voltage tracks. In some embodiments, generating a supply voltage floorplan that includes a plurality of tiles includes generating tiles that have a different number of at least one supply voltage track. In some embodiments, generating a supply voltage floorplan that includes a plurality of tiles includes generating at least one higher speed tile and at least one lower power tile in the plurality of tiles.

At step 904, the method includes placing standard cells from the multiple versions of standard cell libraries on the tiles of the plurality of tiles. In some embodiments, the method includes placing standard cells that perform the functions of the semiconductor device into the floorplan of the semiconductor device. The standard cells are placed in cell rows of the floorplan and electrically connected to the supply voltage tracks and supply voltages. During optimization of the timing delays, timing variations, and power consumption, the standard cells are selected from different versions of the standard cell libraries to meet the constraints of the semiconductor device.

At step 906, the method includes routing conductive nets between the standard cells of the integrated circuit and, at step 908, the method includes providing a routed integrated circuit.

Disclosed embodiments thus provide semiconductor devices that include multiple supply voltage tracks that provide multiple supply voltages, where each of the multiple supply voltage tracks is configured to provide one or more supply voltages. The disclosed embodiments further provide standard cells configured to be electrically connected to the supply voltage tracks to receive the one or more supply voltages and to a reference track to receive a reference voltage, such as ground.

Disclosed embodiments also include multiple standard cell libraries, where each of the multiple standard cell libraries is for a different supply voltage or set of supply voltages. The standard cells in one of the multiple standard cell libraries are identified for use with the supply voltage or set of supply voltages corresponding to the standard cell library. Also, standard cells that perform the same function that are in different standard cell libraries are labeled for use with the supply voltage or set of supply voltages that correspond to their standard cell library.

Disclosed embodiments further include devices that include a plurality of tiles, where each of the tiles includes multiple different supply voltage tracks. In some embodiments, a first tile includes a first combination of supply voltage tracks, and a second tile includes a second combination of supply voltage tracks that is different from the first combination of supply voltage tracks. In some embodiments, a device includes a higher speed tile that includes two or more first supply voltage tracks that each provide a first voltage and at least one second supply voltage track that provides a second voltage that is less than the first voltage, wherein the higher speed tile includes more first supply voltage tracks than second supply voltage tracks. In some embodiments, a device includes a lower power tile that includes at least one first supply voltage track that provides a first voltage and two or more second supply voltage tracks that provide a second voltage that is less than the first voltage, wherein the lower power tile includes fewer first supply voltage tracks than second supply voltage tracks. In some embodiments, semiconductor devices include different compositions, i.e., different relative numbers, of high-speed tiles and low power tiles.

Disclosed embodiments further include methods of manufacturing a semiconductor device, such as an integrated circuit. In some embodiments, the method includes generating multiple versions of standard cell libraries that are each for a different supply voltage or set of supply voltages; generating a supply voltage floorplan that includes a plurality of tiles that each include multiple supply voltage tracks; placing the standard cells from the multiple versions of standard cell libraries on the tiles; routing conductive nets between the standard cells; and providing a routed semiconductor device.

Advantages of the disclosed embodiments include providing multiple different supply voltages to the standard cells for optimizing timing delays, timing variations, and power consumption constraints, reducing the impact of timing variations with minimal APR design flow changes, allowing increased usage of higher Vt cells for saving power without layout changes, and reducing power consumption in ultra-low voltage semiconductor devices.

In accordance with some embodiments, a device includes a first supply voltage track, a second supply voltage track, a first reference track, a first standard cell, and a second standard cell. The first supply voltage track is configured to provide a first voltage and the second supply voltage track is configured to provide a second voltage that is greater than the first voltage. The first standard cell is configured to be electrically connected to the first supply voltage track to receive the first voltage and electrically connected to the first reference track. The second standard cell is configured to be electrically connected to the second supply voltage track to receive the second voltage and electrically connected to the first reference track.

In accordance with further embodiments, a device includes a plurality of tiles that include a speed tile and a power tile. The speed tile includes two or more first supply voltage tracks that each provide a first voltage and at least one second supply voltage track that provides a second voltage that is less than the first voltage, where the speed tile includes more first supply voltage tracks than second supply voltage tracks. The power tile includes at least one first supply voltage track that provides the first voltage and two or more second supply voltage tracks that provide the second voltage, where the power tile includes fewer first supply voltage tracks than second supply voltage tracks.

In accordance with still further disclosed aspects, a method of manufacturing an integrated circuit includes: generating multiple versions of standard cell libraries, where each version of the standard cell libraries is for a different supply voltage; generating a supply voltage floorplan that includes a plurality of tiles, where each of the plurality of tiles includes multiple supply voltage tracks; placing standard cells from the multiple versions of standard cell libraries on the tiles of the plurality of tiles; routing conductive nets between the standard cells of the integrated circuit; and providing a routed result of the integrated circuit.

This disclosure outlines various embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A device, comprising:
a first supply voltage track configured to provide a first voltage;
a second supply voltage track configured to provide a second voltage that is greater than the first voltage;
a first reference track;
a first standard cell configured to be electrically connected to the first supply voltage track to receive the first voltage and electrically connected to the first reference track; and
a second standard cell configured to be electrically connected to the second supply voltage track to receive the second voltage and electrically connected to the first reference track,
wherein the second supply voltage track is configured to provide the first voltage, the second voltage, and a third voltage that is greater than the second voltage.

2. The device of claim 1, comprising a third standard cell configured to be electrically connected to the second supply voltage track to receive the first voltage and to receive the second voltage and to receive the third voltage and electrically connected to the first reference track.

3. The device of claim 1, comprising:
a third supply voltage track configured to provide the third voltage;
a second reference track; and
a third standard cell configured to be electrically connected to the second supply voltage track to receive the second voltage and electrically connected to the second reference track.

4. The device of claim 3, comprising:
a fourth standard cell configured to be electrically connected to the third supply voltage track to receive the third voltage and electrically connected to the second reference track.

5. The device of claim 1, wherein the first supply voltage track is configured to provide the first voltage and the second voltage.

6. The device of claim 5, comprising a third standard cell configured to be electrically connected to the first supply voltage track to receive the first voltage and to receive the second voltage and electrically connected to the first reference track.

7. The device of claim 1, comprising:
a third supply voltage track configured to provide the first voltage or the third voltage that is greater than the second voltage;
a second reference track; and
a third standard cell configured to be electrically connected to the third supply voltage track to receive the first voltage or the second voltage and electrically connected to the second reference track.

8. The device of claim 1, comprising:
a first library including the first standard cell configured to be electrically connected to the first supply voltage track to receive the first voltage and electrically connected to the first reference track; and
a second library including the first standard cell configured to be electrically connected to the second supply voltage track to receive the second voltage and electrically connected to the first reference track.

9. The device of claim 1, comprising multiple devices in the first standard cell, wherein:
the first supply voltage track intersects the first standard cell at a first height;
the second supply voltage track intersects the first standard cell at a second height that is different than the first height;
at least one of the multiple devices is configured to be electrically connected to the first supply voltage track to receive the first voltage and electrically connected to the first reference track; and at least one other of the multiple devices is configured to be electrically connected to the second supply voltage track to receive the second voltage and electrically connected to the first reference track.

10. A device, comprising:
a first supply voltage track configured to provide a first voltage;
a second supply voltage track configured to provide a second voltage that is greater than the first voltage;
a first reference track;
a first standard cell including multiple devices and configured to be electrically connected to the first supply voltage track to receive the first voltage and electrically connected to the first reference track; and
a second standard cell configured to be electrically connected to the second supply voltage track to receive the second voltage and electrically connected to the first reference track, wherein:
the first supply voltage track intersects the first standard cell at a first height;
the second supply voltage track intersects the first standard cell at a second height that is different than the first height;
at least one of the multiple devices is configured to be electrically connected to the first supply voltage track to receive the first voltage and electrically connected to the first reference track; and
at least one other of the multiple devices is configured to be electrically connected to the second supply voltage track to receive the second voltage and electrically connected to the first reference track.

11. The device of claim 10, wherein the second supply voltage track is configured to provide the first voltage, the second voltage, and a third voltage that is greater than the second voltage.

12. The device of claim 11, comprising a third standard cell configured to be electrically connected to the second supply voltage track to receive the first voltage and to receive the second voltage and to receive the third voltage and electrically connected to the first reference track.

13. The device of claim 10, comprising:
a third supply voltage track configured to provide a third voltage;
a second reference track; and
a third standard cell configured to be electrically connected to the second supply voltage track to receive the second voltage and electrically connected to the second reference track.

14. The device of claim 13, comprising:
a fourth standard cell configured to be electrically connected to the third supply voltage track to receive the third voltage and electrically connected to the second reference track.

15. The device of claim 10, wherein the first supply voltage track is configured to provide the first voltage and the second voltage.

16. The device of claim 15, comprising a third standard cell configured to be electrically connected to the first supply voltage track to receive the first voltage and to receive the second voltage and electrically connected to the first reference track.

17. A device, comprising:
a plurality of tiles including:
a speed tile that includes:
two or more first supply voltage tracks that each provide a first voltage; and
at least one second supply voltage track that provides a second voltage that is less than the first voltage, wherein the speed tile includes more first supply voltage tracks than second supply voltage tracks; and
a power tile that includes:
at least one first supply voltage track that provides the first voltage;
two or more second supply voltage tracks that provide the second voltage, wherein the power tile includes fewer first supply voltage tracks than second supply voltage tracks; and
at least one third supply voltage track that provides a third voltage that is greater than the second voltage, wherein the power tile includes fewer third supply voltage tracks than second supply voltage tracks.

18. The device of claim 17, wherein the speed tile includes at least one fourth supply voltage track that provides a fourth voltage that is less than the first voltage, wherein the speed tile includes more first supply voltage tracks than fourth supply voltage tracks.

19. The device of claim 17, comprising a normal tile that includes a first number of speed tiles and a second number of power tiles, wherein the first number is the same as the second number.

20. The device of claim 17, wherein the plurality of tiles includes more speed tiles or more power tiles.

* * * * *